US012399327B2

(12) United States Patent
Ando et al.

(10) Patent No.: US 12,399,327 B2
(45) Date of Patent: Aug. 26, 2025

(54) OPTICAL MEMBER AND BLIND SPOT ASSISTANCE DEVICE USING THE SAME

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hiroshi Ando, Nisshin (JP); Masatoshi Tsuji, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 288 days.

(21) Appl. No.: 18/177,393

(22) Filed: Mar. 2, 2023

(65) Prior Publication Data

US 2023/0375786 A1 Nov. 23, 2023

(30) Foreign Application Priority Data

May 19, 2022 (JP) ................. 2022-082424

(51) Int. Cl.
*G02B 6/34* (2006.01)
*B60R 1/00* (2022.01)
(Continued)

(52) U.S. Cl.
CPC ............... *G02B 6/34* (2013.01); *B60R 1/002* (2013.01); *B60R 13/025* (2013.01); *G02B 6/3616* (2013.01)

(58) Field of Classification Search
CPC . H04W 12/122; H04W 12/108; H04W 24/10; H04W 4/40; H04W 4/44;
(Continued)

(56) References Cited

U.S. PATENT DOCUMENTS 5,719,649 A * 2/1998 Shono ................. G02B 6/0036
362/617
6,441,978 B1 8/2002 Kobayashi et al.
(Continued)

FOREIGN PATENT DOCUMENTS

EP 3138735 A1 * 3/2017 ........... B60Q 1/2607
JP 2015-143087 A 8/2015
(Continued)

*Primary Examiner* — Thomas A Hollweg
*Assistant Examiner* — Erin D Chiem
(74) *Attorney, Agent, or Firm* — Posz Law Group, PLC

(57) ABSTRACT

An optical member includes a light guide made of a transparent material. The light guide has: an incident surface; an exit surface having exit portions and flat portions; a smooth surface arranged opposite to the flat portions; an upper surface and a lower surface arranged opposite to each other so as to connect the smooth surface and the exit surface; a first protrusion protruding from the upper surface; and a second protrusion protruding from the lower surface. The flat portions reflect the incident light toward the smooth surface by total reflection. The smooth surface reflects the reflected light reflected by the flat portion toward the exit surface by total reflection. The exit portions emit a part of the incident light or a part of light reflected by the smooth surface to the outside.

6 Claims, 20 Drawing Sheets

(51) Int. Cl.
  *B60R 13/02*   (2006.01)
  *G02B 5/04*    (2006.01)
  *G02B 6/36*    (2006.01)

(58) Field of Classification Search
  CPC ...... H04W 84/06; H04W 88/06; H04B 1/715; B60R 13/025; B60R 1/081; B60R 2300/202; B60R 2300/802; G02B 6/0038; G02B 6/0053; G02B 6/0036
  See application file for complete search history.

(56) References Cited

U.S. PATENT DOCUMENTS

| | | | |
|---|---|---|---|
| 6,553,702 B1 * | 4/2003 | Bacnik | G09F 3/204 |
| | | | 40/649 |
| 8,087,811 B2 * | 1/2012 | Pakhchyan | G02B 6/0033 |
| | | | 362/617 |
| 10,322,673 B2 * | 6/2019 | Kondo | G02B 27/01 |
| 2002/0105738 A1 | 8/2002 | Kobayashi et al. | |
| 2016/0318448 A1 * | 11/2016 | Haruyama | B60R 1/04 |

FOREIGN PATENT DOCUMENTS

| | | | | |
|---|---|---|---|---|
| JP | 2015147496 A * | 8/2015 | | |
| JP | 2016-049807 A | 4/2016 | | |
| WO | WO-2017110519 A1 * | 6/2017 | ............... | B60R 1/04 |
| WO | WO-2019167444 A1 * | 9/2019 | | |

* cited by examiner

OPTICAL MEMBER AND BLIND SPOT ASSISTANCE DEVICE USING THE SAME

CROSS REFERENCE TO RELATED APPLICATION

This application is based on Japanese Patent Application No. 2022-082424 filed on May 19, 2022, the disclosure of which is incorporated herein by reference.

TECHNICAL FIELD

The present disclosure relates to an optical member that internally reflects a part of light incident from an incident surface and emits the incident light and the reflected light outward from a surface different from the incident surface, and a blind spot assistance device using the optical member.

BACKGROUND

An optical member is attached to a pillar of a vehicle and used as part of a blind spot assistance device.

SUMMARY

An optical member that internally reflects and guides an external scene light includes a light guide made of a transparent material. The light guide has: an incident surface on which the external scene light is incident; an exit surface at which an incident light incident from the incident surface arrives at a first time, the exit surface having a plurality of exit portions and a plurality of flat portions; a smooth surface arranged opposite to the plurality of flat portions; an upper surface and a lower surface arranged opposite to each other so as to connect the smooth surface and the exit surface; a first protrusion protruding from the upper surface; and a second protrusion protruding from the lower surface. The plurality of flat portions is a first reflecting surface configured to reflect the incident light toward the smooth surface by total reflection. The smooth surface is a second reflecting surface configured to reflect the reflected light reflected by the flat portion toward the exit surface by total reflection. The plurality of exit portions emits a part of the incident light or a part of light reflected by the smooth surface to the outside.

DETAILED DESCRIPTION

Figure 1:
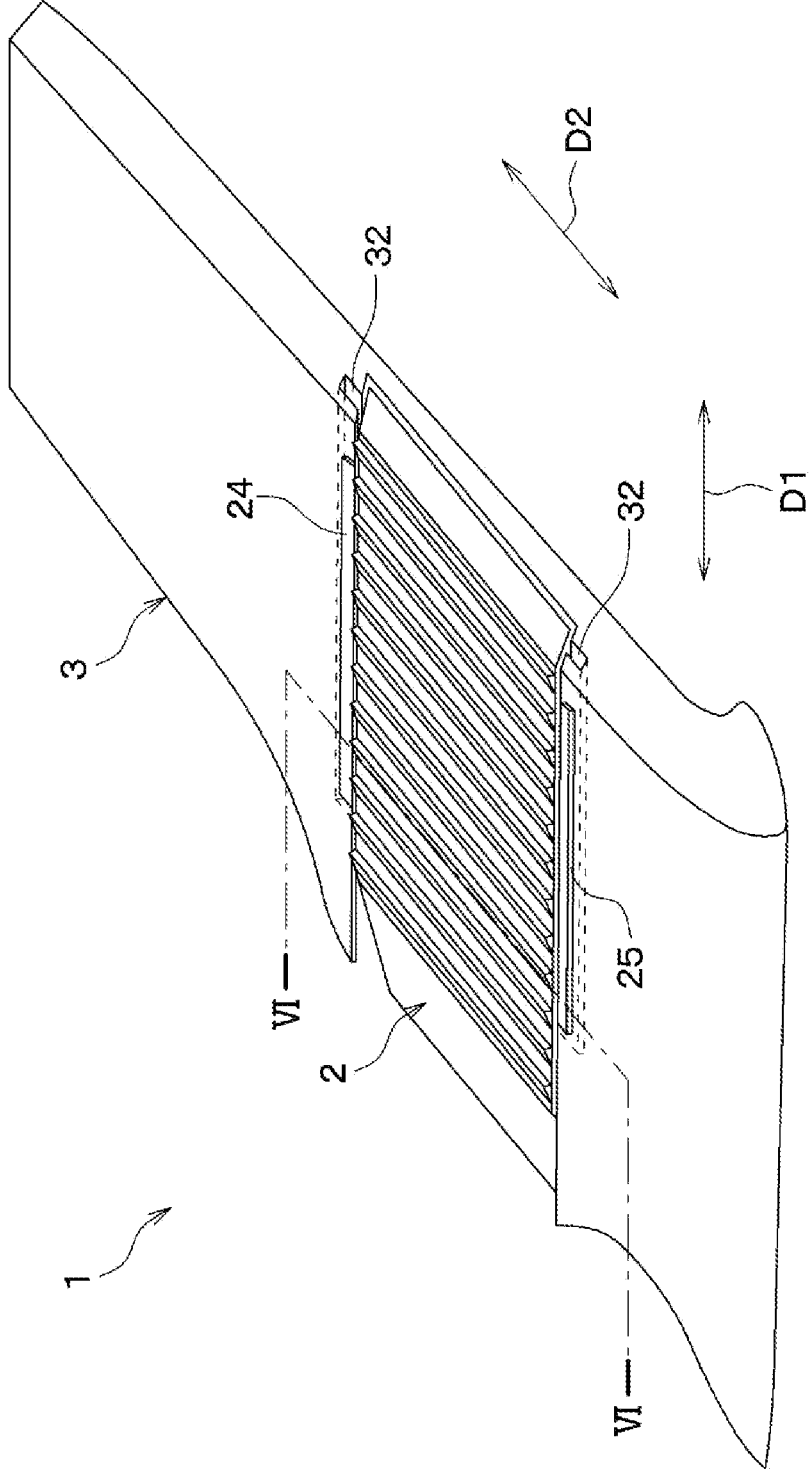
FIG. 1 is a perspective view of a blind spot assistance device according to a first embodiment.

Conventionally, an optical member is attached to a pillar of a vehicle and used as part of a blind spot assistance device. The optical member includes: a half mirror that partially reflects and transmits a part of external scene light; a mirror that reflects the reflected light from the half mirror toward the half mirror; and a case body holding the half mirror and the mirror opposite from each other. The case body is attached to a pillar of a vehicle.

In the optical member, when an external scene light enters from the opposite side of the pillar, the external scene light is repeatedly reflected between the mirror and the half mirror, and transmitted through the half mirror that is mounted on the opposite side of the pillar. As a result, the blind spot assistance device enables visual confirmation of the external scene in the blind spot hidden by the pillar through the optical member.

However, since the mirror and the half mirror are separate members in the optical member, the relative position of the mirror and the half mirror may be changed. In this case, the position of the external scene due to the light transmitted through the half mirror may deviate from the actual situation. In other words, the position of the external scene visually recognized by the user through the optical member may deviate from the actual situation. In order to restrict such a situation, it is necessary to provide a housing for holding the half mirror and the mirror so that their relative position does not shift, and a fixing member for fixing the housing and the mirrors. Further, the mirrors should be fixed so that the relative position of the mirrors does not shift due to vibration expected in case where the optical member is used in a vehicle, when the housing holding the mirrors is attached to the pillar of the vehicle.

The structure for suppressing the relative positional deviation between the mirrors requires a large number of components, and the assembly to other members such as pillar is complicated and precision is required. Furthermore, in order to suppress the displacement of the relative position between the mirrors due to vibration, the housing is firmly fixed to another member. The optical member cannot be separated from the housing only after the housing has been removed from another member. Therefore, it becomes difficult to deal with dirt on the optical member.

The present disclosure provides an optical member and a blind spot assistance device using the optical member, in which there is no relative positional deviation between an exit surface and a reflecting surface, and easy to attach to and detach from another member. The exit surface reflects and transmits incident external scene light. The reflecting surface reflects the incident external scene light toward the exit surface. The blind spot assistance device makes it easy to remove the optical member from another member.

According to a first aspect of the present disclosure, an optical member that internally reflects and guides an external scene light includes a light guide made of a transparent material. The light guide has: an incident surface on which the external scene light is incident; an exit surface at which an incident light incident from the incident surface arrives at a first time, the exit surface having a plurality of exit portions and a plurality of flat portions; a smooth surface arranged opposite to the plurality of flat portions; an upper surface and a lower surface arranged opposite to each other so as to connect the smooth surface and the exit surface; a first protrusion protruding from the upper surface; and a second protrusion protruding from the lower surface. The plurality of flat portions is a first reflecting surface configured to reflect the incident light toward the smooth surface by total reflection. The smooth surface is a second reflecting surface configured to reflect the reflected light reflected by the flat portion toward the exit surface by total reflection. The plurality of exit portions emits a part of the incident light or a part of light reflected by the smooth surface to the outside.

This optical member is a single member made of a transparent material. A part of the external scene light incident from the incident surface is reflected by the flat portion and the smooth surface by total reflection, and a part of the incident external scene light is emitted outward from the exit portion. The optical member has the first protrusion on the upper surface and the second protrusion on the lower surface, while the smooth surface and the exit surface are connected by the upper surface and the lower surface. The optical member is easy to handle because it is easy to attach to and detach from the other member, and it is unnecessary to touch the optical surface other than the protrusions. Therefore, the optical member is easy to attach to and detach from the other member, while there is no relative positional deviation between the exit surface and the reflecting surface.

According to a second aspect of the present disclosure, a blind spot assistance device includes an optical member made of a transparent material and a holding member that holds the optical member. The optical member has: an incident surface on which the external scene light is incident; an exit surface at which an incident light incident from the incident surface arrives at a first time, the exit surface having a plurality of exit portions and a plurality of flat portions; a smooth surface arranged opposite to the plurality of flat portions; an upper surface and a lower surface arranged opposite to each other so as to connect the smooth surface and the exit surface; a first protrusion protruding from the upper surface; and a second protrusion protruding from the lower surface. The holding member has a fitting portion to fit with the first protrusion and the second protrusion of the optical member so as to hold the optical member. The plurality of flat portions is a first reflecting surface configured to reflect the incident light toward the smooth surface by total reflection. The smooth surface is a second reflecting surface configured to reflect the reflected light reflected by the flat portion toward the exit surface by total reflection. The plurality of exit portions emits a part of the incident light or a part of light reflected by the smooth surface to the outside away from the holding member.

The blind spot assistance device includes the optical member and the holding member that holds the optical member. The holding member has the fitting portion that fits with the protrusion of the optical member. In other words, in the blind spot assistance device, a single optical member that does not cause misalignment between the exit surface and the smooth surface is fitted to the holding member. Therefore, it does not require a component for suppressing the misalignment while the optical member is easily attached to and detached from. Thus, it is possible to suppress the positional deviation of the external scene, and it is possible to easily assemble the optical member and remove from the blind spot assistance device. It is easy to perform a maintenance of the blind spot assistance device.

The reference numerals attached to the components and the like indicate an example of correspondence between the components and the like and specific components and the like in embodiments to be described below.

Hereinafter, embodiments of the present disclosure will be described with reference to the drawings. In the following embodiments, the same reference numerals are assigned to portions that are the same or equivalent to each other for description.

First Embodiment

A blind spot assistance device 1 of the first embodiment will be described with reference to the drawings.

Figure 4:
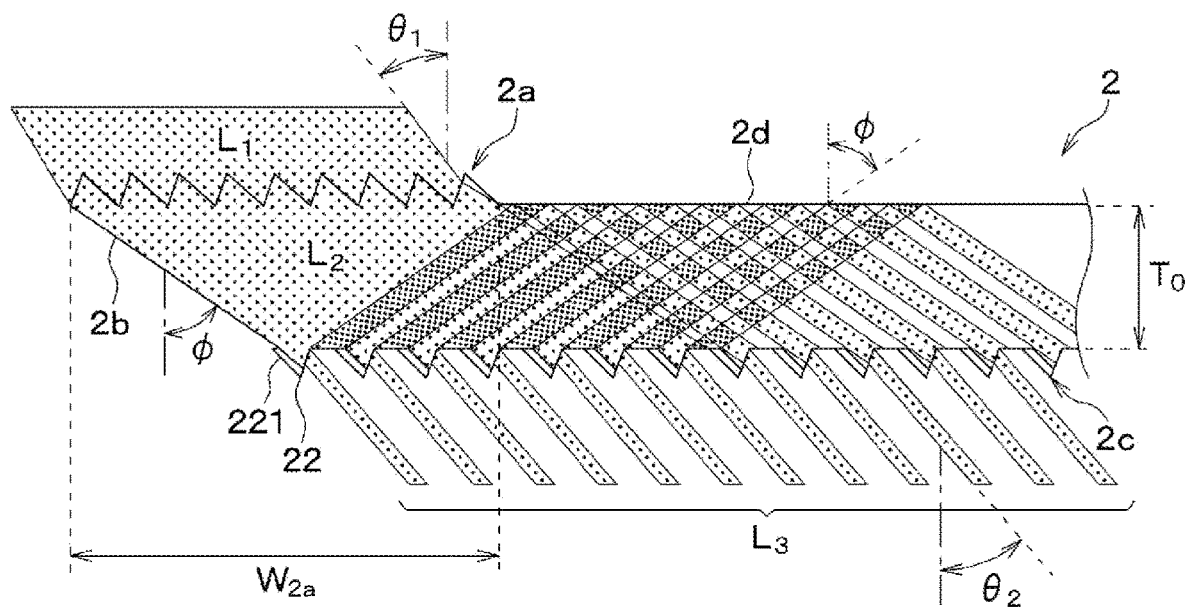
FIG. 4 is an explanatory diagram illustrating guided light in the optical member.
Figure 5:
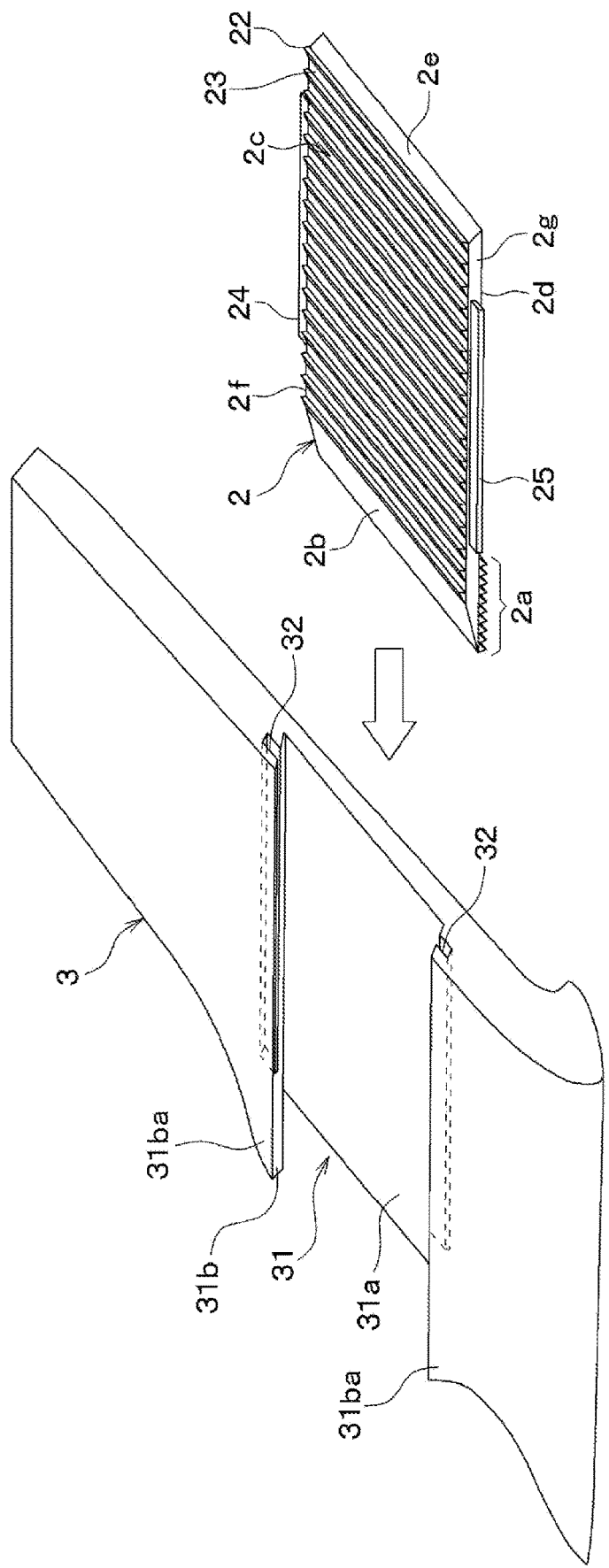
FIG. 5 is a perspective exploded view of the blind spot assistance device of the first embodiment.

In FIGS. 1 and 5, in order to make the configuration of the blind spot assistance device 1 easier to understand, the outline of the groove 32 of the holding member 3, which is not visible from the angle shown in FIGS. 1 and 5, is indicated by a broken line. In FIG. 1, the outline of the optical member 2, which is hidden by the holding member 3, is indicated by a solid line. In FIG. 4, the light is hatched in order to make it easier to understand how the external scene light is guided in the optical member 2.

For convenience of explanation, as shown in FIG. 1, a first direction D1 is defined relative to the holding member 3 along a light guiding direction in the optical member 2. A second direction D2 is defined to connect the protrusions 24, 25 of the optical member 2. D1 and D2 shown in FIG. 2 and subsequent figures are directions corresponding to D1 and D2 shown in FIG. 1. For convenience, the first direction D1 may be referred to as lateral direction of the holding member 3, and the second direction D2 may be referred to as a longitudinal direction of the holding member 3.

As shown in FIG. 1, the blind spot assistance device 1 of the present embodiment has the optical member 2 and the holding member 3, and the optical member 2 is attached to the holding member 3. The blind spot assistance device 1 is configured to emit the external scene light from the blind spot due to the holding member 3 by guiding inside the optical member 2 toward the user, thereby making the blind spot visible. The blind spot assistance device 1 is preferably applied to, for example, an in-vehicle use in which the holding member 3 is a pillar that obstructs the driver's field of vision in a vehicle such as an automobile, such that the driver or the like can visually recognize the blind spot. The blind spot assistance device 1 can also be applied to the other applications. In this specification, the blind spot assistance device 1 is used for in-vehicle use as a representative example.

Figure 2:
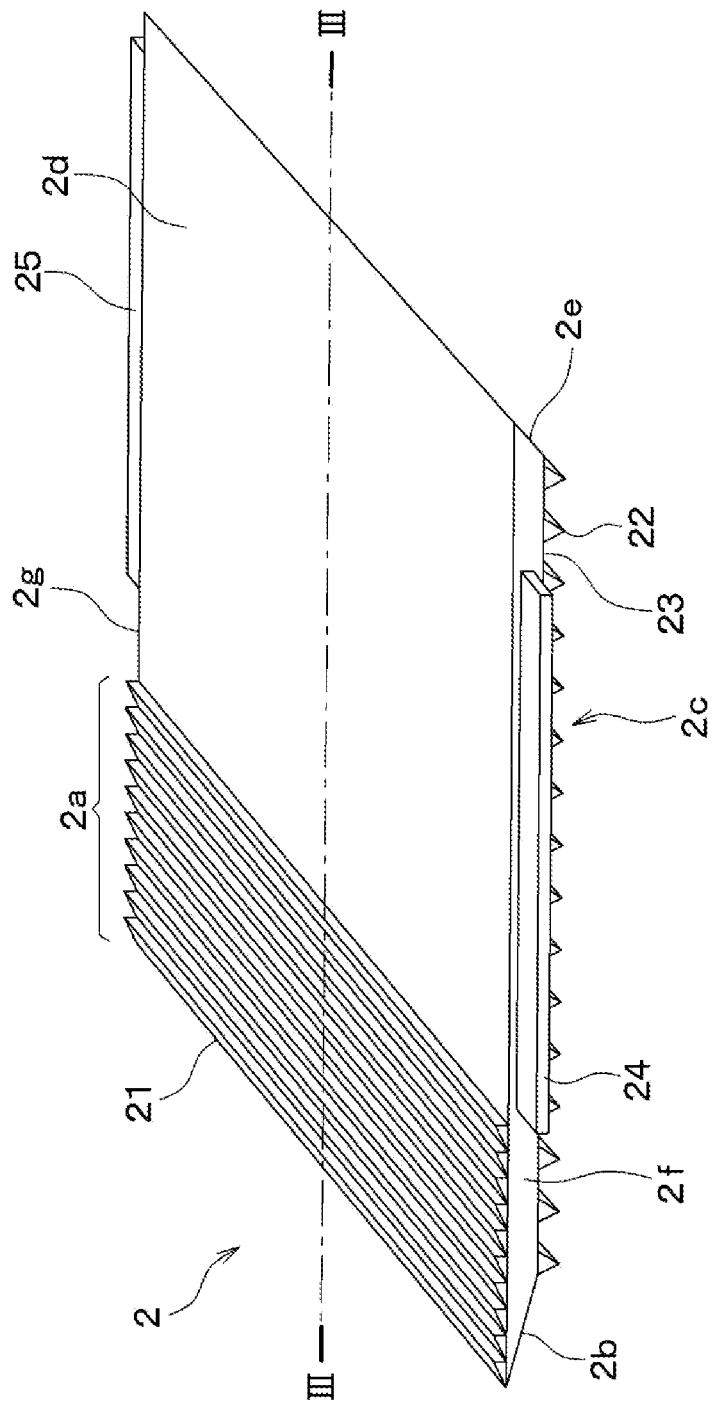
FIG. 2 is a perspective view of an optical member viewed from another angle.

As shown in FIG. 2, the optical member 2 is a light guide having an incident portion 2a, a smooth surface 2d adjacent to the incident portion 2a, an exit surface 2c opposite to the smooth surface 2d, an incident side surface 2b connecting the incident portion 2a and the exit surface 2c, and an end surface 2e opposite to the incident side surface 2b. The optical member 2 has an upper surface 2f and a lower surface 2g to connect the exit surface 2c and the smooth surface 2d and connect the incident side surface 2b and the end surface 2e. The optical member 2 has a first protrusion 24 and a second protrusion 25 formed on the upper surface 2f and the lower surface 2g, respectively, which are not used for internal light guiding. The optical member 2 is a single member whose base portion is made of a transparent material. In a situation where there is no incident light to the incident portion 2a, when the user views the optical member 2 alone from the exit surface 2c side, the optical member 2 is a light guide that allows visual recognition of the scene on the smooth surface 2d side. The transparent material that can be used is, for example, resin material such as polyethylene terephthalate, polycarbonate, polyethylene, or acrylic, and inorganic materials such as glass. The optical member 2 does not have a mirror made of a reflective material having a reflectance higher than a predetermined value, and is designed to guide incident light by totally reflecting it on a surface made of a transparent material.

Figure 3:
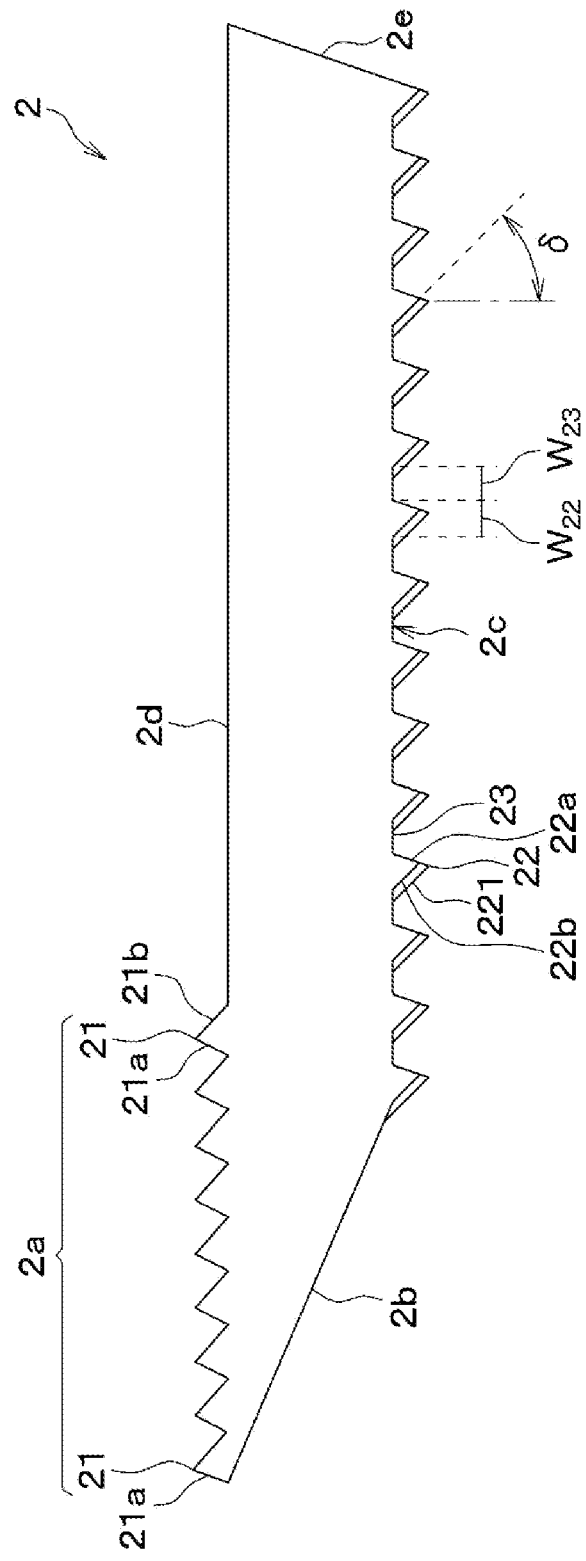
FIG. 3 is a cross-sectional view taken along line III-III in FIG. 2.

In the present embodiment, as shown in FIG. 3, the optical member 2 has the incident portion 2a arranged on a plane formed by the smooth surface 2d. The incident portion 2a and the smooth surface 2d are opposite to the exit surface 2c. An end of the incident portion 2a of the optical member 2 opposite to the smooth surface 2d is adjacent to the incident side surface 2b. An end of the smooth surface 2d of the optical member 2 opposite to the incident portion 2a is adjacent to the end surface 2e. The incident side surface 2b and the end surface 2e are opposite to each other.

Hereinafter, for convenience of explanation, as shown in FIG. 4, an external scene light $L_1$ is defined to travel from the outside of the optical member 2 toward the incident portion 2a. A part of the external scene light $L_1$ incident from the incident portion 2a into the optical member 2 is defined as incident light $L_2$. A part of the incident light $L_2$ emitted from the exit surface 2c to the outside of the optical member 2 may be referred to as emitted light $L_3$.

In this embodiment, the incident portion 2a is formed by repeatedly and continuously arranging prisms 21 having mutually similar shapes in the same orientation. Each of the prisms 21 has, for example, a triangular shape in the cross-sectional view. The prism 21 has an incident surface 21a, which is an outer surface away from the smooth surface 2d, through which a part of the external scene light $L_1$ is incident. The prisms 21 are arranged, for example, such that the incident surfaces 21a are substantially parallel to each other. The prism 21 has an adjacent surface 21b, which is an outer surface adjacent to the smooth surface 2d. In each of the prisms 21, the inclination angle of the adjacent surface 21b is set to be less than or equal to a predetermined value so as not to hinder the entrance of the external scene light $L_1$ to the incident surface 21a.

The incident portion 2a has a valley portion, which is a contact point between the incident surface 21a and the adjacent surface 21b between the prisms 21 adjacent to each other. The valley portions are positioned on the plane formed by the smooth surface 2d. In other words, the incident portion 2a is configured such that the optical path length of the incident light $L_2$ from the incident surface 21a to the flat portion 23 of the exit surface 2c is substantially the same among the prisms 21. As a result, it is possible to minimize the distortion of the external scene image visually recognized by the user due to the emitted light $L_3$ emitted from the exit portion 22 of the exit surface 2c.

As shown in FIG. 4, an incident angle of the incident light $L_2$ on the flat portion 23 is defined as $\varphi$. It is preferable that the inclination formed by the incident side surface 2b is larger than or equal to the incident angle $\varphi$ so that the incident light $L_2$ is not emitted to the outside from the incident side surface 2b. The incident angle $\varphi$ of the incident light $L_2$ is defined between a normal direction normal to the plane formed by the flat portion 23 or the smooth surface 2d (hereinafter simply referred to as the "normal direction") and the traveling direction of the incident light $L_2$. The incident angle $\varphi$ of the incident light $L_2$ changes depending on the incident angle $\theta 1$ of the external scene light $L_1$, the refractive index n1 of the optical member 2, and the refractive index n2 of the external medium (for example, air). The incident angle $\theta 1$ of the external scene light $L_1$ is defined between the traveling direction of the external scene light $L_1$ and the normal direction.

As shown in FIG. 4, the optical member 2 is designed to satisfy the following Formula (1) in order to totally reflect the incident light $L_2$ at the flat portion 23 of the exit surface 2c and the smooth surface 2d, which are made of a transparent material.

$$\sin \varphi \geq n2/n1 \quad \text{Formula (1):}$$

As a result, a part of the incident light $L_2$ from the incident surface 21a is totally reflected by the flat portion 23 and the smooth surface 2d, and is emitted to the outside from the exit surface 2c, even while the optical member 2 does not have a semi-transmissive mirror or a mirror.

As shown in FIG. 4, the exit surface 2c has an exit portion 22 and a flat portion 23 adjacent to the exit portion 22. The exit portion 22 is a triangular protrusion in the cross-sectional view. The flat portion 23 is substantially parallel to the smooth surface 2d. The incident light $L_2$ from the incident portion 2a reaches the exit surface 2c for the first time. The exit surface 2c is formed by repeatedly arranging the exit portions 22 and the flat portions 23 alternately. The exit portion 22 is a position at which the incident light $L_2$ is emitted to the outside. The flat portion 23 is a first reflecting surface that reflects the incident light $L_2$ toward the smooth surface 2d by total reflection. Thereby, the optical member 2 can guide the incident light $L_2$ inside without having a semi-transmissive mirror made of a metal material or a dielectric material, and there is no loss due to the absorption of the incident light $L_2$ in the flat portion 23.

One virtual plane formed by the flat portions 23 is defined as a flat surface. A direction along the flat surface from the incident side surface 2b to the end surface 2e is defined as light guiding direction, and the width of the flat portion 23 in the light guiding direction is defined as $W_{23}$. At this time, the flat portion 23 has the width $W_{23}$ such that the reflectance of the incident light $L_2$ on the exit surface 2c is equal to or greater than a predetermined value. Specifically, the flat portion 23 of the exit surface 2c is a reflective portion configured to reflect the incident light $L_2$, and the exit portion 22 is an absorption portion and exit portion relative to the incident light $L_2$. The reflectance Rw of the exit surface $2c$ is determined by the proportion of the flat portion 23. The reflectance Rw of the exit surface $2c$ is represented by Formula (2), where $W_{22}$ is the width of the exit portion 22 adjacent to the flat portion 23 hacing the width $W_{23}$ in the light guiding direction.

$$Rw = W_{23}/(W_{22}+W_{23}) \qquad \text{Formula (2):}$$

It is preferable that the flat portion 23 has the width $W_{23}$ where $Rw \geq /0.5$, that is, the reflection of the incident light $L_2$ on the exit surface $2c$ is greater than or equal to the emission, that is, the width satisfying $W_{22}/W_{23} \leq 1$. In this case, the optical member 2 guides more than half of the incident light $L_2$ through the exit surface $2c$ and emits the emitted light $L_3$ over a wider range of the exit surface $2c$, thereby ensuring the brightness of the emitted light $L_3$.

Further, when the optical member 2 satisfies Formula (1) and the incident angle φ is the angle of total reflection, the reflectance Rw at the exit surface $2c$ is determined only by, as shown in Formula (2), the width ratio of the exit portion 22 and the flat portion 23. In other words, since the reflectance Rw of the optical member 2 does not depend on the angle and wavelength of the incident light $L_2$, it is possible to suppress change in the color tone and brightness of the emitted light $L_3$ compared with a conventional optical member using a semi-transmissive mirror.

The exit portion 22 has a first surface $22a$ adjacent to the flat portion 23. The first surface $22a$ protrudes from the flat portion 23 outward, and emits a part of the incident light $L_2$ to the outside. As shown in FIG. 3, the exit portion 22 has a projecting shape having the first surface $22a$ and a second surface $22b$ opposite to the first surface $22a$ to intersect with the first surface $22a$. The exit portions 22 have similar shapes.

The first surface $22a$ of the exit portion 22 is, for example, substantially parallel to the incident surface $21a$. When the first surface $22a$ is parallel to the incident surface $21a$, the exit angle θ2 of the emitted light $L_3$ from the first surface $22a$ is the same as the incident angle θ1. Thus, light beam which is the same as the external scene light $L_1$ can be visually recognized by the user across the exit surface $2c$, due to the optical member 2.

The exit angle θ2 of the emitted light $L_3$ is formed between the traveling direction of the emitted light $L_3$ and the normal direction. In addition to the case where the incident surface $21a$ and the first surface $22a$ are parallel to each other, "substantially parallel" means that the incident surface $21a$ and the first surface $22a$ are approximately parallel to each other due to unavoidable errors due to the processing accuracy of the optical member 2. In the following specification, "substantially parallel" has the same meaning.

The second surface $22b$ of the exit portion 22 is inclined at an inclination angle δ with respect to the normal direction. The second surface $22b$ is preferably covered with a light absorbing film 221, for example, from the viewpoint of suppressing reflection of the incident light $L_2$ on the second surface $22b$ and entry of external light from the exit surface $2c$. As a result, it is possible to suppress ghosts formed by superimpose of outside light from the exit surface $2c$ on the emitted light $L_3$, and noise caused by unintended reflected light of the incident light $L_2$ on the second surface $22b$ being emitted from the first surface $22a$. The light absorbing film 221 may be made of light-shielding resin material or light-shielding metal material, and may be formed by a proper processing, such as printing or vapor deposition. The base portion of the optical member 2 excludes the light absorbing film 221.

The second surface $22b$ has the inclination angle δ greater than or equal to the exit angle θ2 of the emitted light $L_3$, and greater than or equal to the incident angle θ1 of the external scene light $L_1$ when the incident surface $21a$ and the first surface $22a$ are parallel. As a result, the emitted light $L_3$ is emitted to the outside without being blocked by the second surface $22b$. In addition, it is preferable that the second surface $22b$ has the inclination angle δ smaller than the incident angle φ (light guide angle) of the incident light $L_2$ on the flat portion 23. This suppresses the incident light $L_2$ from entering and interfering with the second surface $22b$, and suppresses unintended reflection of the incident light $L_2$ on the second surface $22b$ and noise resulting therefrom.

If the width $W_{22}$ of the exit portion 22 and the width $W_{23}$ of the flat portion 23 are all the same, a gap of the width $W_{22}$ is formed in the reflected light beam. If the relationship between the gap and the exit portion 22 has a periodic change, unevenness in brightness, that is, moire, may occur. From the viewpoint of suppressing such moire, it is preferable that $W_{22}$ and $W_{23}$ have values within a predetermined range centering on a certain value, that is, have a distribution.

The smooth surface $2d$ is the second reflecting surface configured to reflect the incident light $L_2$ reflected by the flat portion 23 toward the exit surface $2c$ by total reflection. In other words, the smooth surface $2d$ is an optical surface that is substantially parallel to the flat portion 23 and functions together with the flat portion 23 as a pair of mirrors. Therefore, the incident light $L_2$ from the incident portion $2a$ is repeatedly incident and reflected at the incident angle φ on the flat portion 23 and the smooth surface $2d$, and travels along the light guiding direction, so as to be emitted in the entire area of the exit surface $2c$ from the exit portion 22 to the outside. Then, the remaining portion of the incident light $L_2$ is finally emitted to the outside from the end surface $2e$.

The end surface $2e$ opposite to the incident side surface $2b$ is positioned at the terminal end in the light guiding direction. For example, the end surface $2e$ may be configured to form one surface together with the first surface $22a$ of the exit portion 22 located at the end of the exit portions 22 opposite to the incident side surface $2b$. The inclination of the end surface $2e$ may be adjusted so as to form a curved surface continuous with the holding member 3.

As shown in FIG. 4, the optical member 2 has a height $T_0$ in the normal direction between the flat portion 23 and the smooth surface $2d$, and the incident portion $2a$ has a width $W_{2a}$ in the light guiding direction. The optical member 2 is preferably designed to satisfy Formula (3).

$$W_{2a} = 2T_0 \times \tan \varphi \qquad \text{Formula (3):}$$

In case of $W_{2a} = 2T_0 \times \tan \varphi$, the efficiency is better, when the light is repeatedly reflected, by reducing a light guiding gap and a loss of light, while the area of the exit surface $2c$ where the incident light $L_2$ from the incident portion $2a$ reaches for the first time is not changed. The term "light guiding gap" as used herein refers to a gap between the emitted lights $L_3$ adjacent to each other through the exit portion 22 that does not emit the emitted light $L_3$ in the light guiding direction in a state where the incident light $L_2$ does not reach the exit surface $2c$, that is, the exit portion 22 does not emit the emitted light $L_3$ outward. Further, the loss of light from the incident portion $2a$ is suppressed, while the light guiding gap is not generated, between the emitted lights $L_3$ emitted from the exit surface $2c$, due to the exit portions 22 and the flat portions 23. The "loss of light from the incident portion 2a" means the loss of light rays caused by the incident light $L_2$ reflected by the flat portion 23 to reach the incident portion 2a again and being emitted from the incident portion 2a to the outside. In case of $W_{2a}>2T_0 \times \tan \varphi$, the loss of light is generated while the light guiding gap is not generated. A part of the reflected light reflected by the exit surface 2c reaches the incident portion 2a, not only the smooth surface 2d. In case of $W_{2a}<2T_0 \times \tan \varphi$, the light guiding gap is generated while the loss of light is not generated. The reflected light reaches only the smooth surface 2d.

Since a deviation of about 10% can occur depending on the angle of the incident light, if $W_{2a}$ is within the range of ±10% of the value represented by $2T_0 \times \tan \varphi$, the optical member 2 is less affected by the light loss and the light guiding gap.

The upper surface 2f and the lower surface 2g are non-optical surfaces that are not used for reflecting the incident light $L_2$. The upper surface 2f has the protrusion 24 and the lower surface 2g has the protrusion 25 for fitting with the holding member 3.

Hereinafter, for convenience of explanation, the protrusion formed on the upper surface 2f is referred to as the first protrusion 24, and the protrusion formed on the lower surface 2g is referred to as the second protrusion 25. In the embodiment, the first protrusion 24 and the second protrusion 25 have the same configuration.

In this embodiment, as shown in FIG. 1, the protrusion 24, 25 is inserted into the groove 32 of the holding member 3, such that the optical member 2 is held by the holding member 3. As shown in FIG. 5, the optical member 2 is inserted in a sliding direction along the groove 32 formed in the housing portion 31 of the holding member 3, such that the smooth surface 2d faces the holding member 3 and that the exit surface 2c faces outward. The width of the protrusion 24, 25 in the light guiding direction is shorter than the width of the upper surface 2f or the lower surface 2g in the light guiding direction, so as not to protrude from the holding member 3. A thickness direction is defined along the height $T_0$ to connect the flat portion 23 and the smooth surface 2d of the optical member 2. A dimension of the protrusion 24, 25 in the thickness direction is set so as to be slidable and fitted with the groove 32. As a result, in the blind spot assistance device 1, the optical member 2 and the holding member 3 can be attached to and detached from each other, so as to facilitate maintenance when dirt or the like adheres.

The optical member 2 having the prism 21, the exit portion 22, and the protrusion 24, 25 is made of a transparent resin material, by a known plastic molding method using a mold or the like.

The optical member 2 is attached to the holding member 3. In case of in-vehicle use, for example, the holding member 3 is a vehicle body pillar such as an A pillar, or a pillar cover that covers the vehicle body pillar. As shown in FIG. 5, the holding member 3 has the housing portion 31 housing the optical member 2 and the groove 32 as a fitting portion into which the protrusion 24, 25 of the optical member 2 is fitted. The groove 32 has a bottom surface 31a and a side wall surface 31b. The bottom surface 31a faces the smooth surface 2d of the optical member 2 in the housing portion 31. The side wall surface 31b is adjacent to the bottom surface 31a and faces the upper surface 2f or the lower surface 2g of the optical member 2. The groove 32 is formed along the first direction D1 on the side wall surface 31b. The side wall surface 31b has a projecting portion 31ba projecting outward of the bottom surface 31a in the first direction D1. The projecting portion 31ba covers a predetermined area of the upper surface 2f and the lower surface 2g of the optical member 2 adjacent to the incident side surface 2b. The groove 32 extends along the first direction D1 from the end of the side wall surface 31b opposite to the projecting portion 31ba, and is formed partway along the side wall surface 31b. As a result, the holding member 3 is configured such that the optical member 2 stays at an appropriate position in the holding member 3 when the optical member 2 is inserted into the holding member 3 along a blank arrow direction in FIG. 5.

Figure 6:
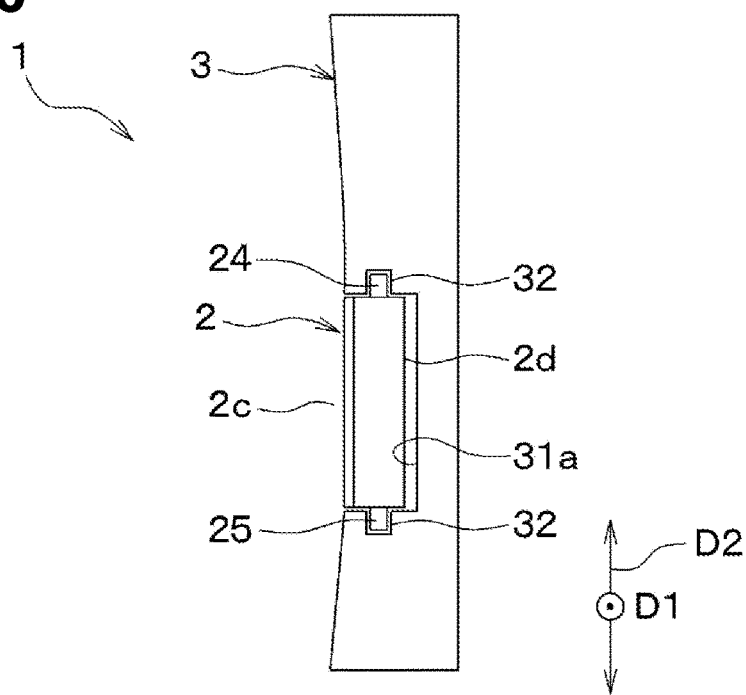
FIG. 6 is a cross-sectional view taken along line VI-VI in FIG. 1.
Figure 7:
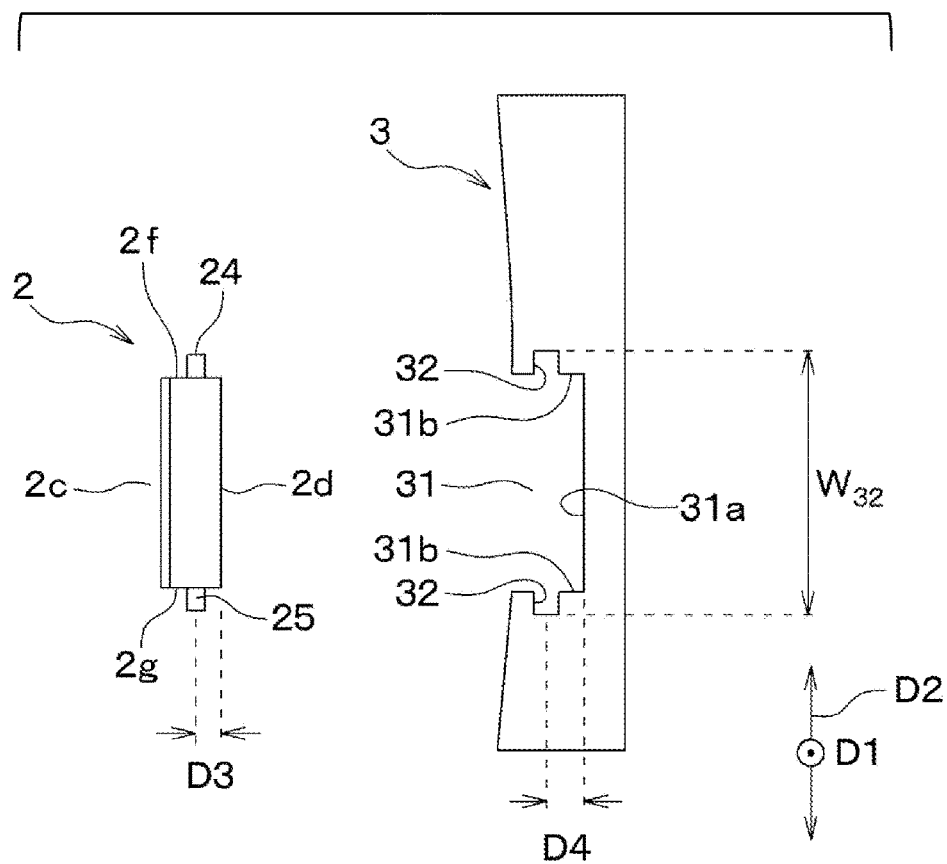
FIG. 7 is an exploded cross-sectional view of the blind spot assistance device of the first embodiment.

As shown in FIG. 6, the holding member 3 is configured such that the optical member 2 is housed in the housing portion 31 and that the protrusion 24, 25 of the optical member 2 is fitted into the groove 32. When the optical member 2 is attached to the holding member 3, a predetermined clearance is provided between the bottom surface 31a of the housing portion 31 and the smooth surface 2d of the optical member 2. The predetermined clearance is not limited but at least 1 mm. Specifically, as shown in FIG. 7, the holding member 3 has a dimension D4 between the center position of the groove 32 and the bottom surface 31a in the thickness direction of the holding member 3. The dimension D4 is larger than a dimension D3 between the center position of the protrusion 24, 25 and the smooth surface 2d in the thickness direction of the optical member 2. As a result, the smooth surface 2d of the optical member 2 and the bottom surface 31a of the holding member 3 are not brought into close contact with each other, and an air layer reliably exists between the smooth surface 2d of the optical member 2 and the bottom surface 31a of the holding member 3. Thus, it is possible to ensure total reflection of the incident light $L_2$ on the smooth surface 2d. Accordingly, the visibility of the external scene across the exit surface 2c can be ensured.

Figure 8:
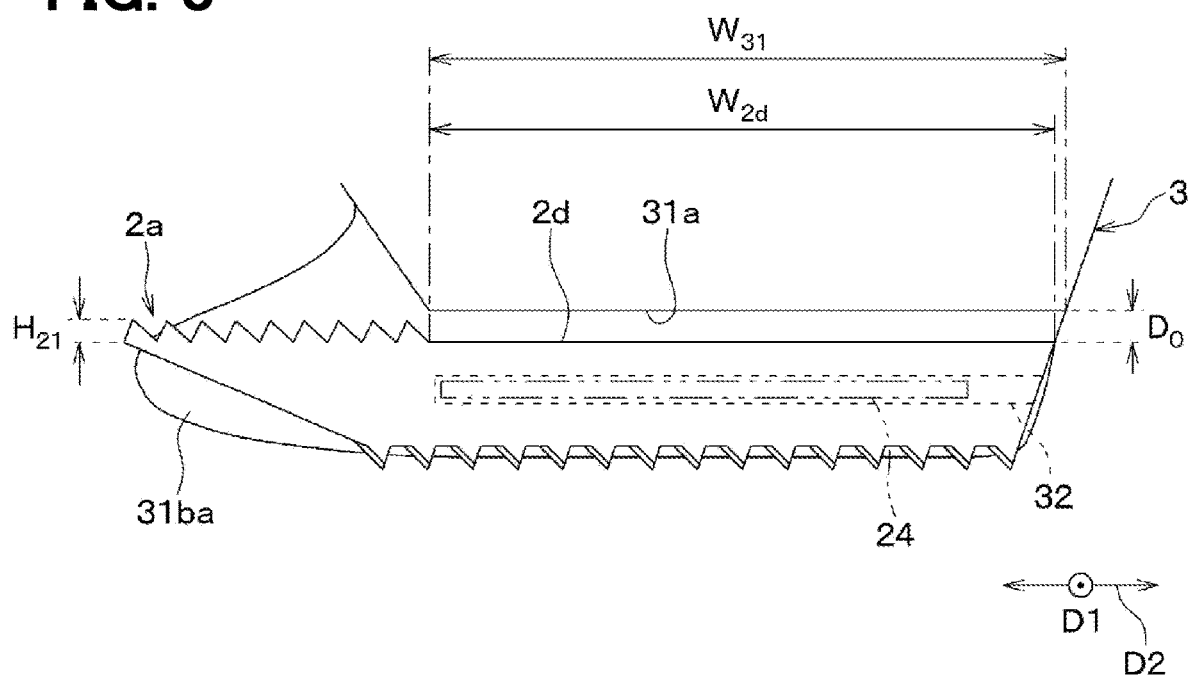
FIG. 8 is a cross-sectional view showing the optical member attached to a holding member.

In the holding member 3, the width $W_{32}$ between the groove 32 on the upper surface and the groove 32 on the lower surface in the second direction D2 is substantially the same as the width between the tip surface of the first protrusions 24 and the tip surface of the second protrusion 25 of the optical member 2. As shown in FIG. 8, the holding member 3 is configured such that the width $W_{31}$ of the housing portion 31 in the first direction D1 is substantially equal to the width $W_{2d}$ of the smooth surface 2d of the optical member 2 in the first direction D1. As a result, the incident portion 2a of the optical member 2 is exposed from the holding member 3, and the external scene light $L_1$ can enter the incident portion 2a. Since the end surface 2e of the optical member 2 does not protrude from the holding member 3, unnecessary external light $L_1$ is restricted from entering the end of the smooth surface 2d adjacent to the end surface 2e.

When the optical member 2 is attached to the holding member 3, a clearance $D_o$ between the bottom surface 31a of the housing portion 31 and the smooth surface 2d of the optical member 2 is larger than the height $H_{21}$ of the prism 21. As a result, when the protrusion 24, 25 of the optical member 2 is slid along the groove 32, the prism 21 of the incident portion 2a does not come into contact with the bottom surface 31a of the housing portion 31. Thus, the optical member 2 can be easier attached and detached. When the holding member 3 is an A-pillar of the vehicle body or a pillar cover that covers the A-pillar, the attachment and detachment of the optical member 2 becomes easier, since the projecting portion 31ba faces toward the windshield.

In the blind spot assistance device 1 of the present embodiment, the optical member 2 that guides the incident light $L_2$ is composed of a single member. Therefore, there is no positional displacement between the exit surface 2c where the incident light $L_2$ is reflected and emitted to the outside, and the smooth surface 2d where the incident light $L_2$ is reflected, that is, to function as a pair of mirrors. In addition, the blind spot assistance device 1 does not require a fixing member for suppressing the relative positional deviation between the mirrors of the optical member 2. The number of components is smaller compared with a conventional art, and the precision required in assembly of the holding member 3 is low. Furthermore, since the optical member 2 has the protrusion 24, 25 and the groove 32 of the holding member 3 functions as a fitting portion for the protrusion 24, 25, the optical member 2 can be easily assembled to the holding member 3 and detached from the holding member 3. Since the protrusion 24, 25 that does not contribute to the light guide is formed on the upper surface 2f and the lower surface 2g of the optical member 2 that does not function as optical surface, the protrusion 24, 25 facilitates the handling when the optical member 2 is assembled to the holding member 3.

Modification of First Embodiment

Figure 9:
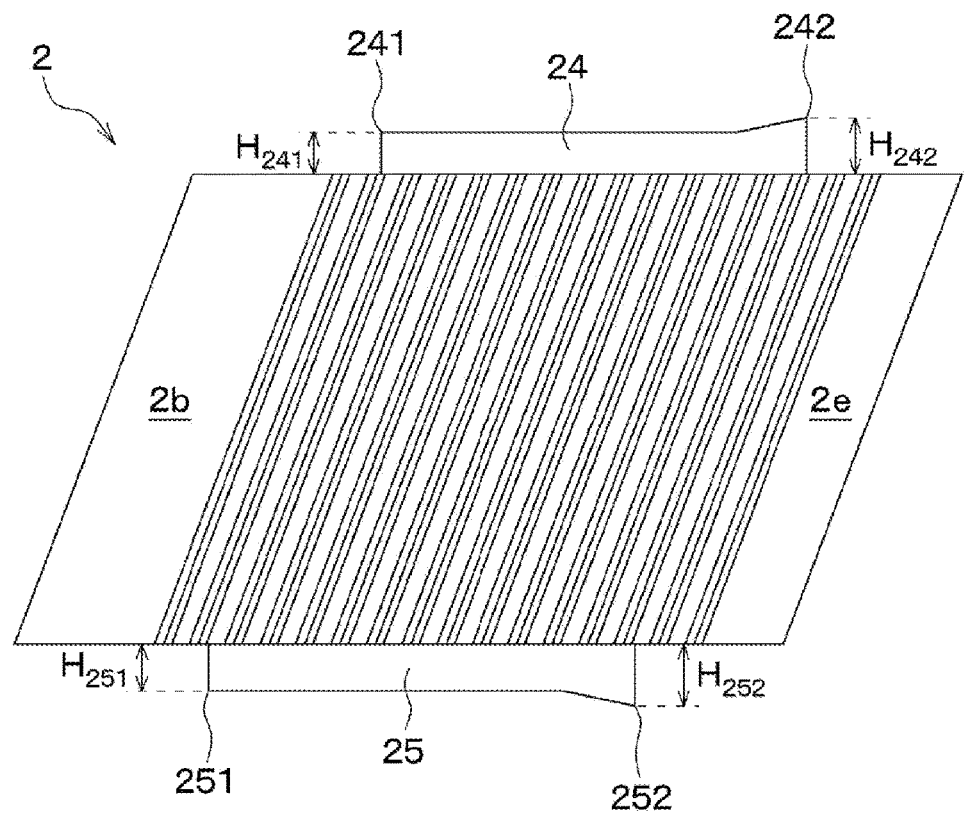
FIG. 9 is a plan view showing an optical member according to a modification of the first embodiment.

As shown in FIG. 9, the optical member 2 may have a configuration in which the end of the protrusion 24, 25 adjacent to the end surface 2e is taller than the other portion. Specifically, the end of the protrusion 24, 25 adjacent to the incident portion 2a is defined as a first end 241, 251, and the end of the protrusion 24, 25 opposite to the incident portion 2a is defined as a second end 242, 252. At this time, the height $H_{242}$ of the second end 242 is greater than the height $H_{241}$ of the first end 241, in the first protrusion 24. In the second protrusion 25, the height $H_{252}$ of the second end 252 is larger than the height $H_{251}$ of the first end 251. The holding member 3 has a substantially constant width $W_{32}$, which is the interval between the upper groove 32 and the lower groove 32 opposite to each other. As a result, when the optical member 2 is attached to the holding member 3, the second end 242, 252 of the protrusion 24, 25 is more firmly fitted into the groove 32 and fixed at appropriate position on the holding member 3, so as not to rattle.

According to this modification, in addition to the effects of the first embodiment, when the optical member 2 is attached to the holding member 3, the groove 32 and a part of the protrusion 24, 25 are fitted more firmly. It is also possible to obtain the effect of further suppressing positional deviation between the optical member 2 and the holding member 3 due to vibration or the like.

Second Embodiment

Figure 11:
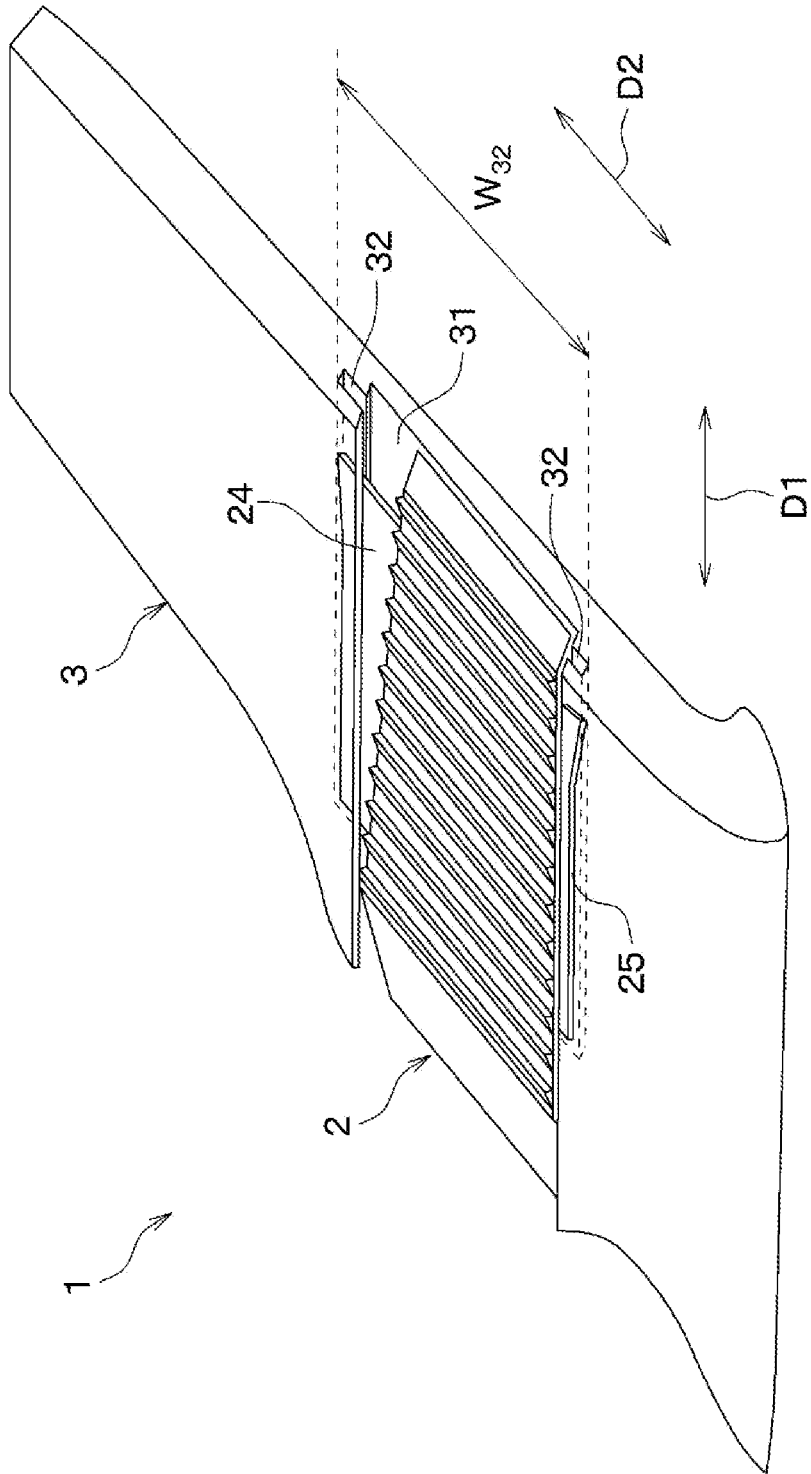
FIG. 11 is a perspective view showing the blind spot assistance device of the second embodiment.

A blind spot assistance device 1 of the second embodiment will be described with reference to the drawings. In FIG. 11, as in FIG. 1, the outline of the groove 32 that is not visible is indicated by a broken line.

Figure 10:
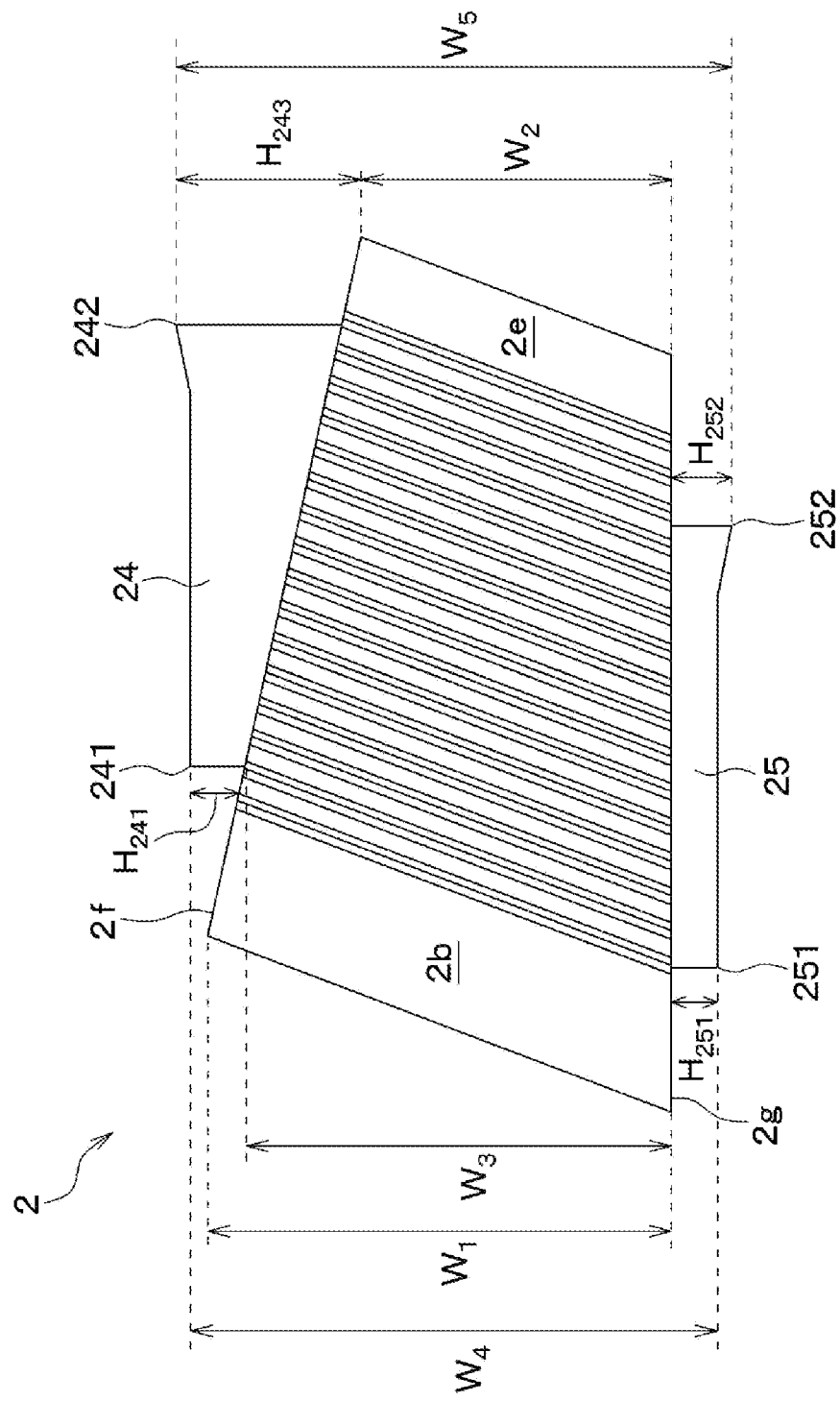
FIG. 10 is a plan view showing an optical member of a blind spot assistance device according to a second embodiment.

In the blind spot assistance device 1 of the present embodiment, as shown in FIG. 10, the width of the optical member 2 becomes narrower from the incident side surface 2b toward the end surface 2e, and the height of the first protrusion 24 on the upper surface 2f becomes higher toward the end surface 2e. This different point will be mainly described in the present embodiment.

In this embodiment, the optical member 2 has a configuration in which the width $W_1$ of the end portion adjacent to the incident portion 2a is larger than the width $W_2$ of the end portion adjacent to the end surface 2e when viewed from the exit surface 2c. In the optical member 2, the distance between the upper surface 2f and the lower surface 2g decreases along the light guiding direction from the incident portion 2a toward the end surface 2e. The height of the first protrusion 24 gradually increases by the decrease in the distance between the upper surface 2f and the lower surface 2g. The height of the first protrusion 24 gradually increases from the first end 241 toward the second end 242.

For example, $W_3$ is the width from the lower surface 2g to the first end 241 of the first protrusion 24 in a lower-surface normal direction which is a normal direction to the lower surface of the optical member 2. The width between the tip surface of the first end 241 of the protrusion 24 and the tip surface of the first end 251 of the protrusion 25 in the lower-surface normal direction is defined as $W_4$. At this time, the optical member 2 has a relationship of $W_4=W_3+H_{241}+H_{251}$. Further, the optical member 2 has a relationship of $W_{32}<W_4<W_5$, where $W_5$ is the width between the tip surface of the second end 242 of the protrusion 24 and the tip surface of the second end 252 of the protrusion 25 in the lower-surface normal direction. As a result, the optical member 2 can be held by inserting the protrusion 24, 25 into the groove 32 of the holding member 3. Further, the second end 242, 252 is more firmly fitted into the groove 32, so as to suppress the positional deviation. The optical member 2 has a relationship of $W_5=W_2+H_{243}+H_{252}$, where $H_{243}$ is a distance between the tip end surface of the second end 252 of the first protrusion 24 and the end of the upper surface 2f adjacent to the end surface 2e in the lower-surface normal direction.

According to the present embodiment, the blind spot assistance device 1 can obtain the same effect as the modification of the first embodiment. In addition, since the width of the first protrusion 24 is large at the second end 242, a contactable area other than the optical surface is large when attaching and detaching the optical member 2 to and from the holding member 3, and the handling becomes easier.

Third Embodiment

Figure 13:
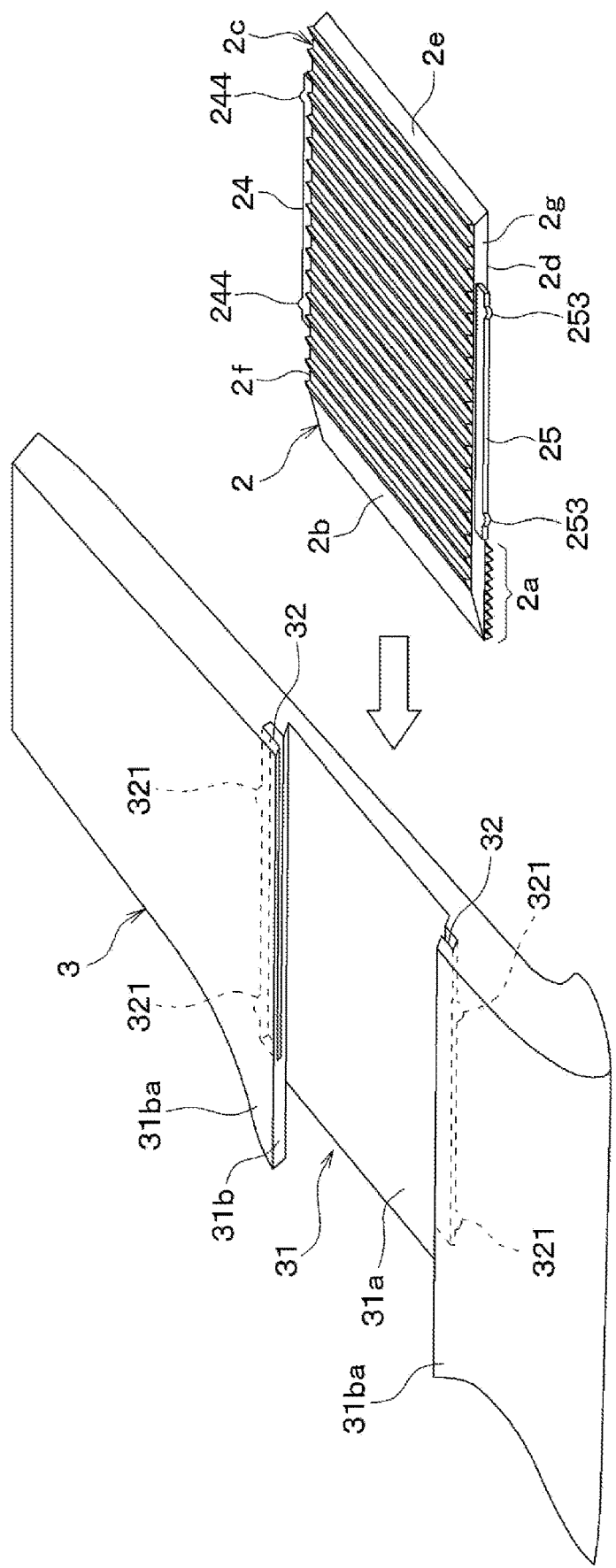
FIG. 13 is a perspective exploded view showing the blind spot assistance device of the third embodiment.

A blind spot assistance device 1 of the third embodiment will be described with reference to the drawings. In FIG. 13, as in FIG. 1, the outline of the groove 32 that is not visible is indicated by a broken line.

Figure 12:
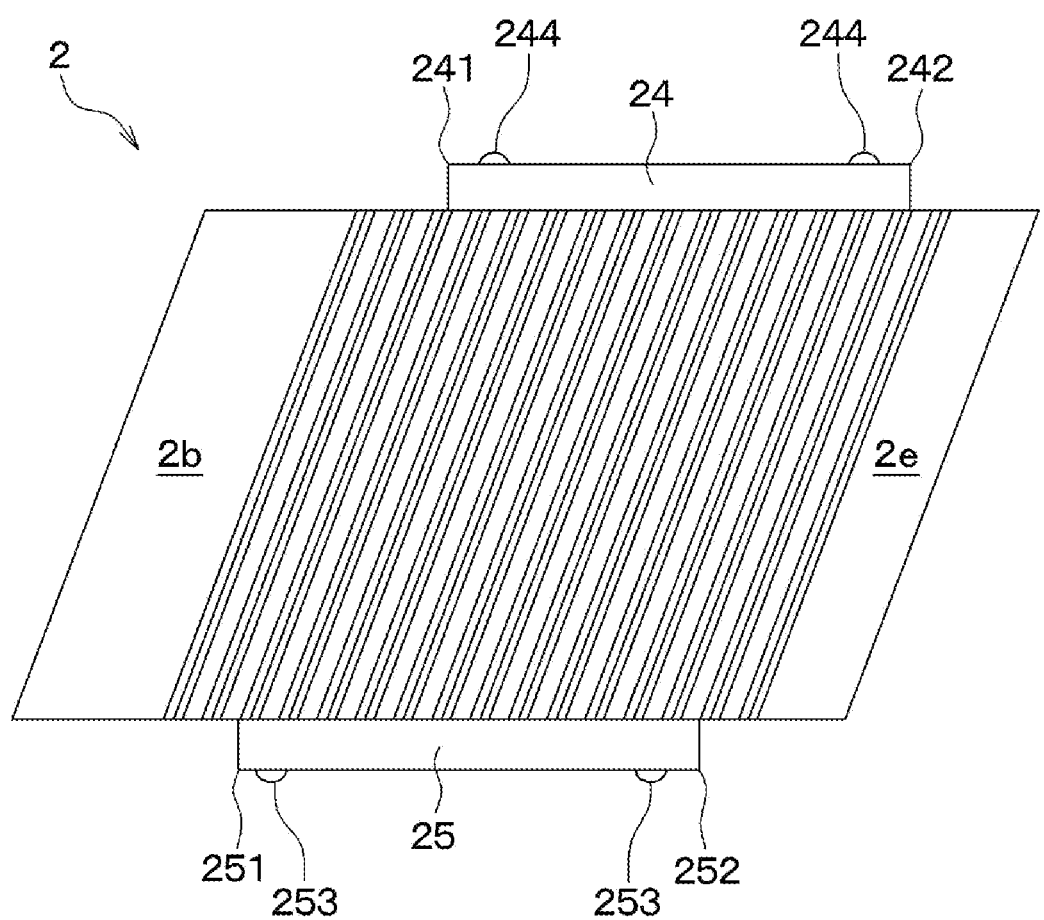
FIG. 12 is a plan view showing an optical member of a blind spot assistance device according to a third embodiment.

In the blind spot assistance device 1 of the present embodiment, as shown in FIGS. 12 and 13, the first protrusion 24 has a fitting convex 244 and the second protrusion 25 has a fitting convex 253, The groove 32 has a recess 321 that engages with the fitting convex 244, 253. This different point will be mainly described in the present embodiment.

In this embodiment, two fitting convex 244 are formed on the tip surface of the first protrusion 24, and two fitting convex 253 are formed on the tip surface of the second protrusion 25. As shown in FIG. 12, the fitting convex 244, 253 is formed near the end of the protrusion 24, 25 in the light guiding direction, but not limited to this. The number and arrangement may be appropriately modified.

Figure 14:
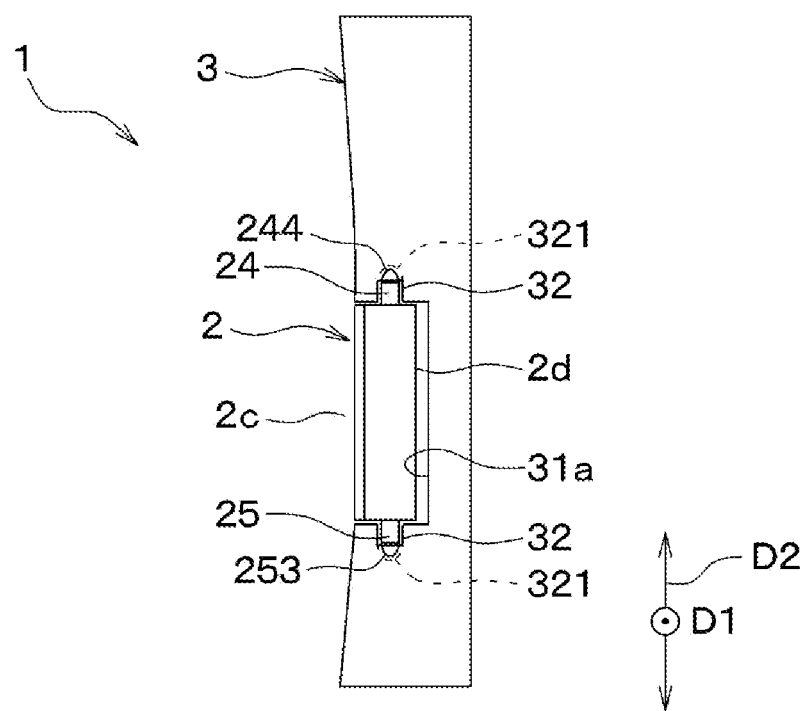
FIG. 14 is a cross-sectional view showing the optical member and a holding member fitted with each other in the third embodiment.

In this embodiment, as shown in FIG. 13, the groove 32 of the holding member 3 has the recess 321 as fitting portion to be fitted with the fitting convex 244, 253 at position corresponding to the fitting convex 244, 253. As shown in FIG. 14, when the protrusion 24, 25 of the optical member 2 is inserted into the groove 32, the fitting convex 244, 253 and the recess 321 are fitted to each other. Therefore, the positional deviation of the optical member 2 attached to the holding member 3 is suppressed. It should be noted that the shape, number, arrangement, etc. of the recess 321 may be appropriately changed according to the shape, number, arrangement, etc. of the fitting convex 244, 253.

According to the present embodiment, the blind spot assistance device 1 can obtain the same effect as the modification of the first embodiment.

Fourth Embodiment

A blind spot assistance device 1 of the fourth embodiment will be described with reference to the drawings.

Figure 15:
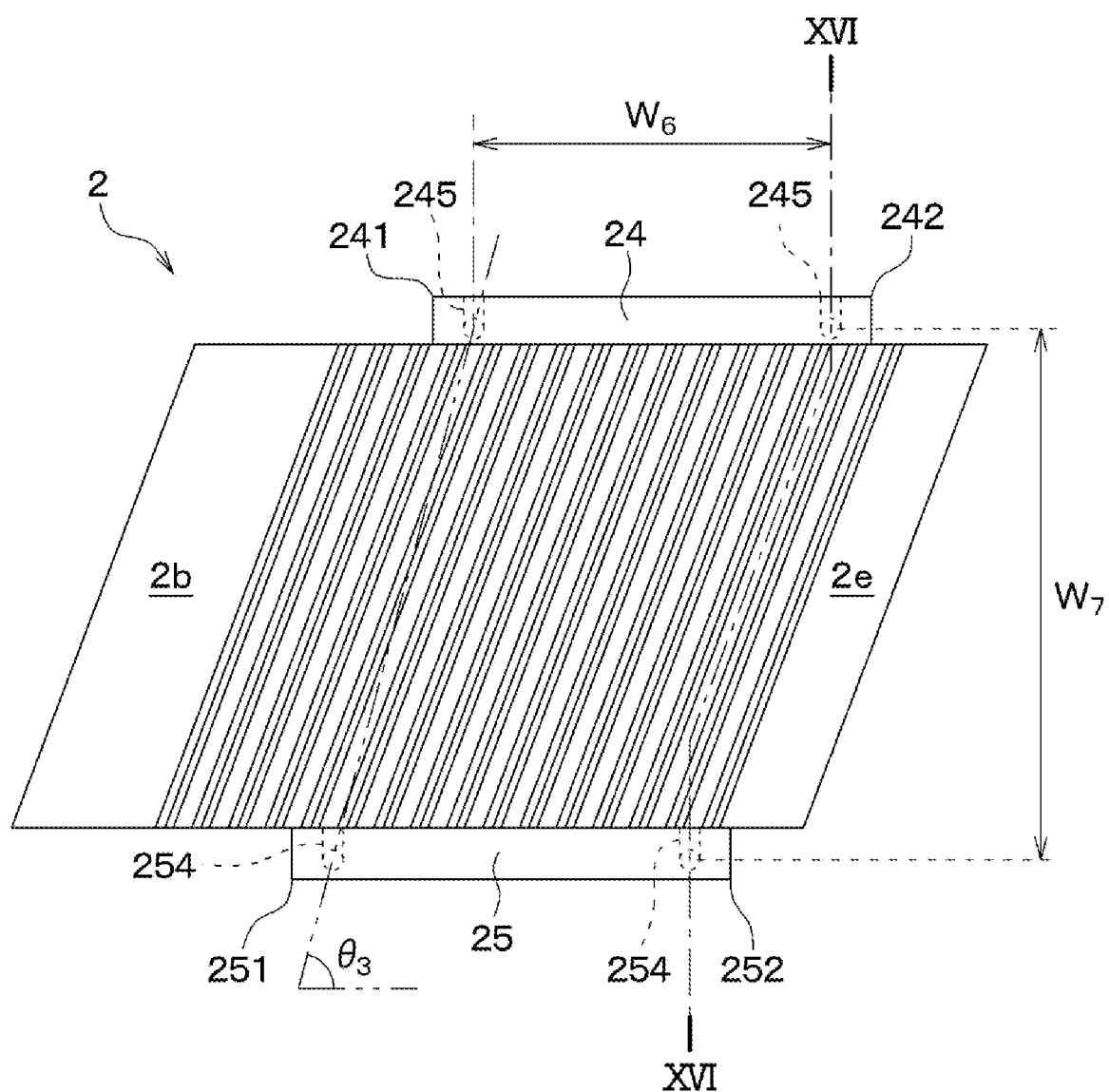
FIG. 15 is a plan view showing an optical member of a blind spot assistance device according to a fourth embodiment.

As shown in FIG. 15, in the blind spot assistance device 1 of the present embodiment, the first protrusion 24 has a fitting hole 245, the second protrusion 25 has a fitting hole 254, and the holding member 3 has hook pins 33 to fit with the fitting holes 245, 254. This different point will be mainly described in the present embodiment.

Figure 16:
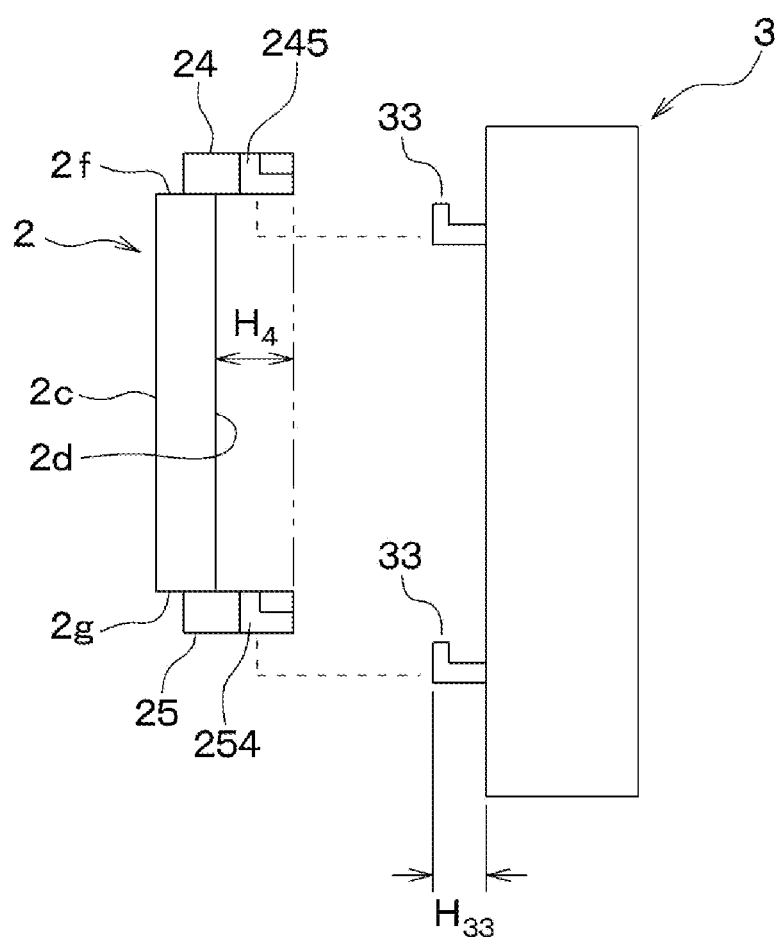
FIG. 16 is a cross-sectional view showing the optical member and a holding member to be fitted with each other in the fourth embodiment.

In this embodiment, as shown in FIG. 16, the protrusion 24, 25 protrudes from the smooth surface 2d by a height $H_4$. The protrusion 24, 25 has the fitting hole 245, 254 for fitting the hook pin 33 of the holding member 3 at position protruding from the smooth surface 2d. The fitting hole 245, 254 has a shape and inner dimension that matches the outer shape and dimension of the hook pin 33. When the hook pin 33 is inserted, the optical member 2 can be fixed in a state of being hooked to the holding member 3. That is, in this embodiment, the fitting hole 245, 254 of the optical member 2 and the hook pin 33 of the holding member 3 are paired to function as fitting portion.

Figure 17:
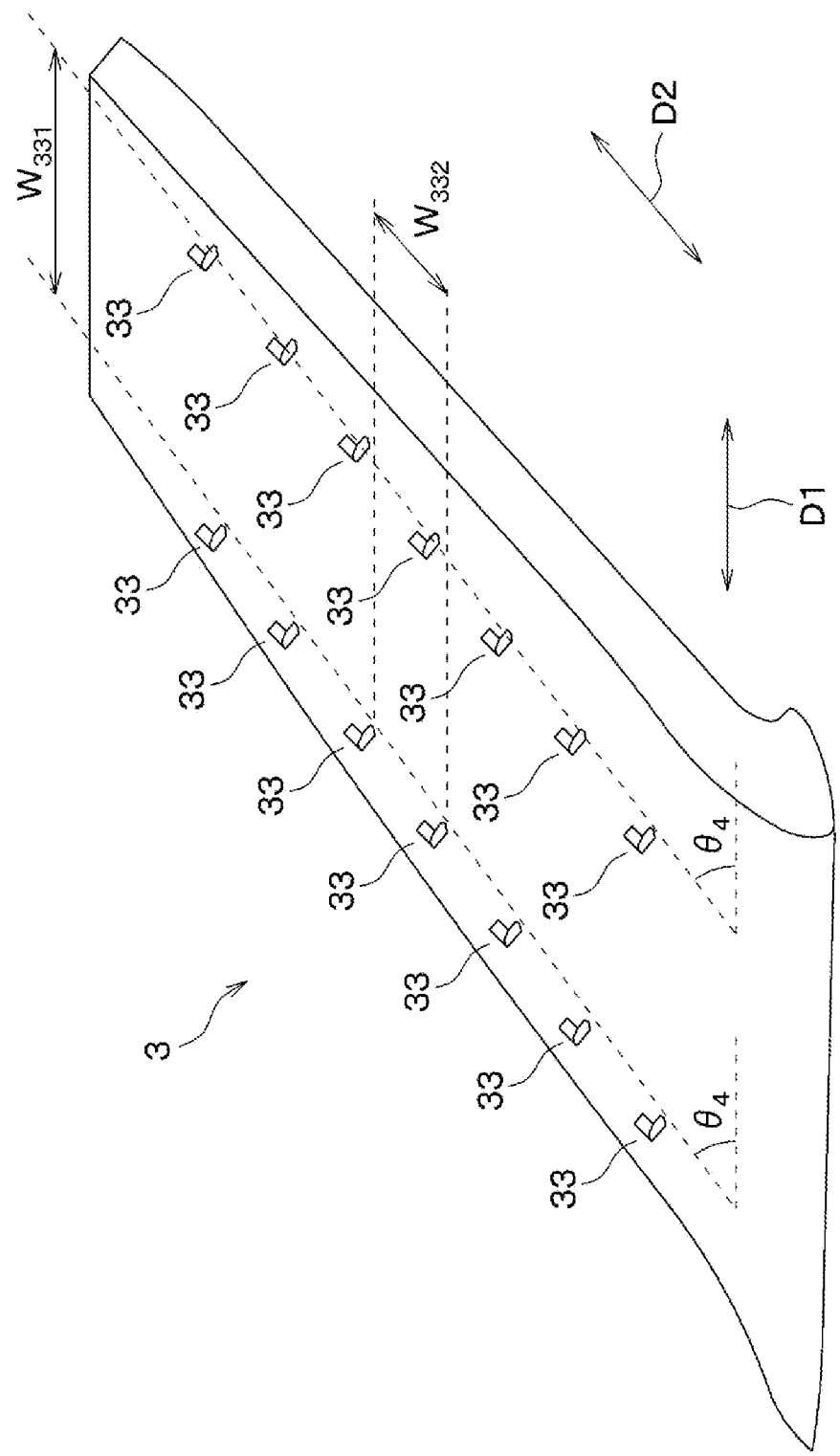
FIG. 17 is a perspective view showing the holding member of the blind spot assistance device in the fourth embodiment.

As shown in FIG. 15, the fitting hole 245 is provided in the vicinity of both ends of the protrusion 24 in the light guiding direction of the optical member 2, and the fitting hole 254 is provided in the vicinity of both ends of the protrusion 25 in the light guiding direction, total of four. In the optical member 2, a distance $W_6$ between the fitting holes 245 of the first protrusion 24 is the same as a distance between the fitting holes 254 of the second protrusion 25. A distance $W_7$ between the fitting hole 245 of the first protrusion 24 and the fitting hole 254 of the second protrusion 25 in the lower-surface normal direction is n (n: an integer equal to or greater than 1) times a distance $W_{332}$ between the hook pins 33 of the holding member 3, as shown in FIG. 17, in the second direction D2. Further, a direction in which the fitting hole 245 of the first protrusion 24 and the fitting hole 254 of the second protrusion 25 are connected is parallel to an arrangement direction in which the hook pins 33 of the holding member 3 are arranged along the second direction D2. As a result, the optical member 2 can be attached to the holding member 3 at an appropriate position.

In this embodiment, as shown in FIG. 17, the holding member 3 does not have a housing portion 31 and a groove 32, but has hook pins 33 arranged in parallel. The hook pins 33 has a protrusion with a height $H_{33}$ as shown in FIG. 16. The height $H_{33}$ is less than the height $H_4$ of the protrusion 24, 25, not to be in contact with the smooth surface 2d of the optical member 2 when being fitted with the fitting hole 245, 254 of the optical member 2. The hook pins 33 are provided at positions corresponding to the positions of the fitting holes 245, 254 of the optical member 2, and are arranged at a predetermined interval in the first direction D1 and the second direction D2, in parallel.

A distance $W_{331}$ is defined between the hook pins 33 adjacent to each other in the first direction D1, and is equal to the distance $W_6$ between the fitting holes 245 and between the fitting holes 254 of the optical member 2. A set of two or more hook pins 33 are defined adjacent to each other in the first direction D1, that is, the lateral direction of the holding member 3. The holding member 3 is configured such that plural sets of hook pins 33 are arranged in parallel along the second direction D2, that is, the longitudinal direction of the holding member 3 at an interval $W_{332}$. The hook pins 33 arranged along the longitudinal direction is parallel to the outer edge of the holding member 3 in the longitudinal direction.

As shown in FIG. 15, an angle θ3 is defined between the light guiding direction and an imaginary straight line connecting the fitting hole 245 at the first end 241 of the first protrusion 24 and the fitting hole 254 at the first end 251 of the second protrusion 25 in the optical member 2. As shown in FIG. 17, an angle θ4 is defined between the first direction D1 along the light guiding direction and an imaginary straight line connecting the hook pins 33 arranged along the second direction D2, that is, the arrangement direction. The hook pins 33 are arranged such that the angle θ4 is equal to the angle θ3.

The number, arrangement, etc. of the fitting holes 245, 254 and the hook pins 33 are not limited to the examples shown in FIGS. 15 and 17, and may be changed as appropriate.

According to the present embodiment, in addition to the same effect as the first embodiment, the mounting position of the optical member 2 on the holding member 3 can be appropriately changed according to the height of the user's line of sight in the blind spot assistance device 1.

Other Embodiment

Although the present disclosure has been described in accordance with the embodiments, it is understood that the present disclosure is not limited to such embodiments or structures. The present disclosure also includes various modifications and modifications within an equivalent range. In addition, various combinations and modes, and further, other combinations and modes including one element of these alone, or thereabove, or therebelow, are also comprised within the scope or concept range of the present disclosure.

Figure 18:
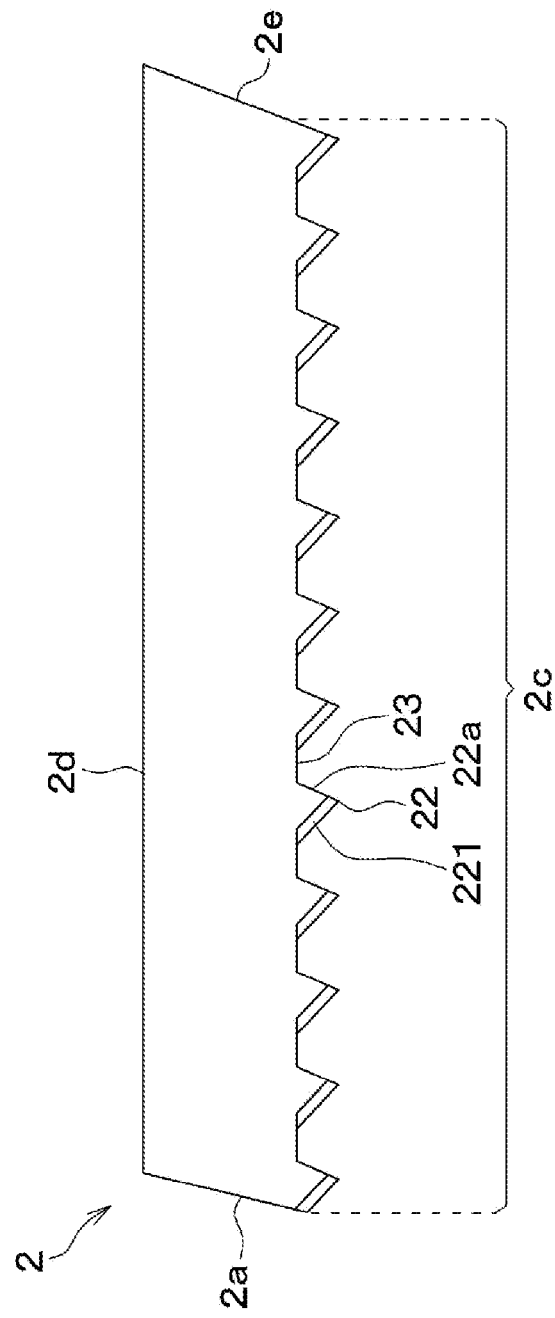
FIG. 18 is a cross-sectional view showing a modification of the optical member corresponding to FIG. 3.

(1) The optical member 2, as shown in FIG. 18, has a configuration in which the incident portion 2a does not have the prism 21 and is a single flat incident surface connecting the exit surface 2c and the smooth surface 2d. In other words, the optical member 2 may be configured such that the incident side surface 2b, which is a flat surface, also serves as the incident portion 2a. Even in this case, the optical member 2 can guide the external scene light $L_1$ from the blind spot across the holding member 3 as seen from the user through the incident portion 2a and emit it toward the exit surface 2c, and it is possible to attach and detach the optical member 2 to and from the holding member 3.

Figure 19:
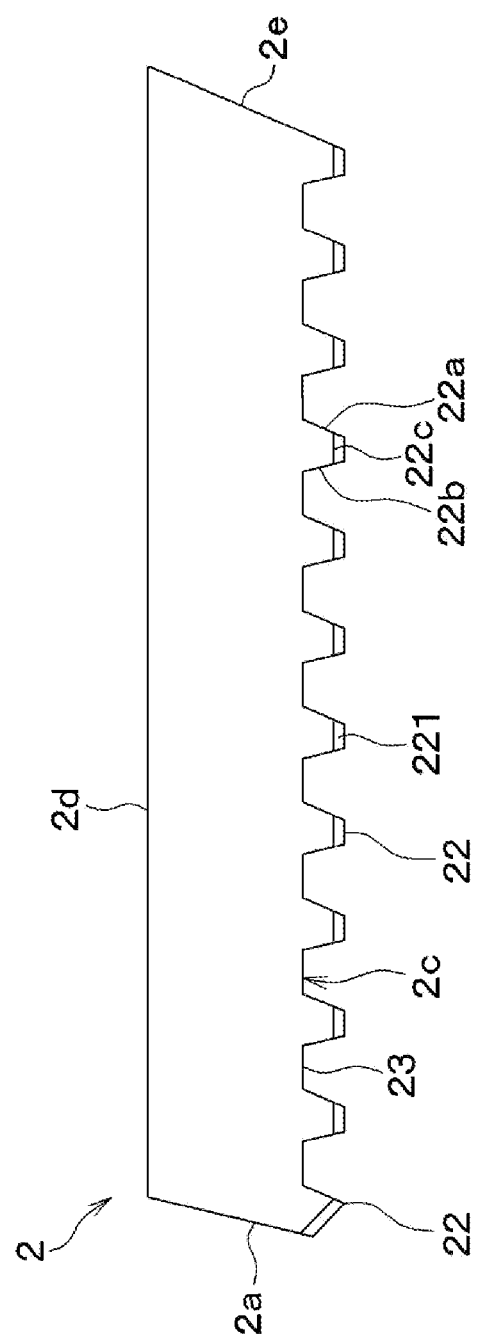
FIG. 19 is a cross-sectional view showing a modification of the optical member corresponding to FIG. 3.

(2) In the optical member 2, as shown in FIG. 19, the incident portion 2a is a single flat incident surface connecting the exit surface 2c and the smooth surface 2d, and the exit portion 22 is substantially trapezoidal in the cross-sectional view, except for the exit portion 22 positioned at the end adjacent to the incident portion 2a. The first surface 22a and the second surface 22b are not adjacent to each other, and the tip surface of the exit portion 22 is a flat third surface 22c connecting the first surface 22a and the second surface 22b.

In the exit portion 22 having the third surface 22c, the light absorbing film 221 is formed not on the second surface 22b but on the third surface 22c. As a result, even if the incident light $L_2$ enters the second surface 22b and is unintentionally reflected, the unintended reflected light is blocked by the light absorbing film 221 formed on the third surface 22c, and is not emitted from the exit surface 2c to the outside. As a result, it is possible to obtain the effect of suppressing the noise caused by the unintended reflected light from the second surface 22b being superimposed on the emitted light $L_3$ emitted from the first surface 22a to the outside.

Figure 20:
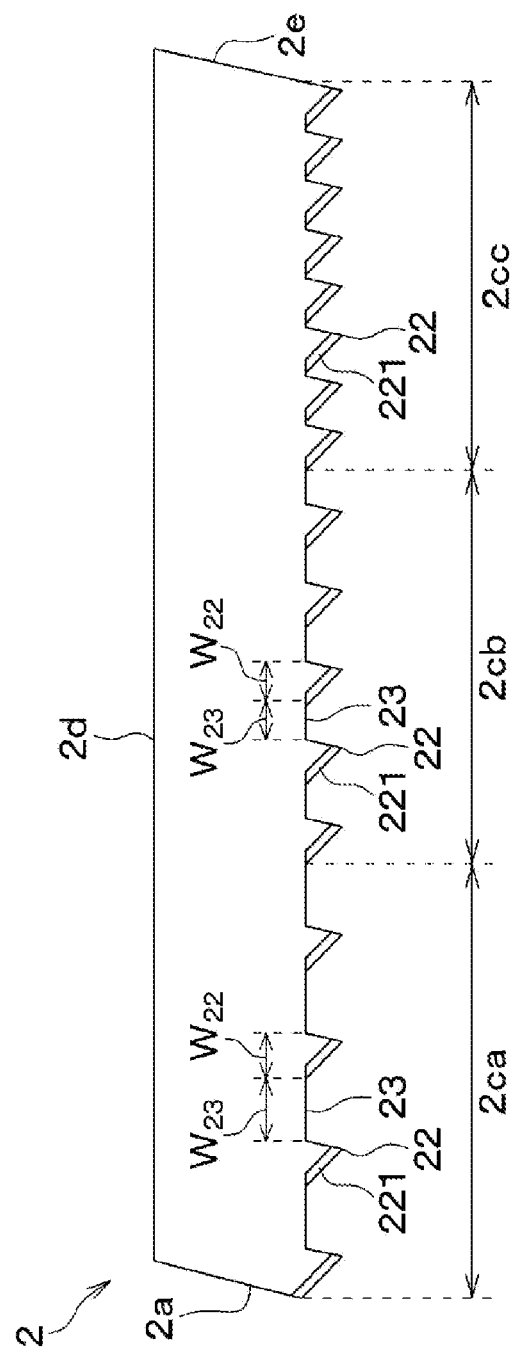
FIG. 20 is a cross-sectional view showing a modification of the optical member corresponding to FIG. 3.

(3) In the optical member 2, as shown in FIG. 20, the incident portion 2a is a single flat incident surface connecting the exit surface 2c and the smooth surface 2d, and the exit surface 2c is divided into plural regions. The interval between the exit portions 22 may be different among the plural regions. In this case, for example, the exit surface 2c is divided into three areas, a first area 2ca, a second area 2cb, and a third area 2cc, along the light guiding direction from the incident portion 2a, and the interval between the exit portions 22 is reduced toward the area closer to the end surface 2e. Specifically, the ratio of the width $W_{22}$ of the exit portion 22 to the width $W_{23}$ of the flat portion 23 is larger in the second area 2cb than in the first area 2ca. The area region 2cc is composed of only the exit portions 22.

More specifically, the reflectance Rw inside the exit surface 2c represented by $W_{23}/W_{22}$ is, for example, ⅔ in the first area 2ca, ½ in the second area 2cb, and 0 in the third area 2cc. In this case, assuming that the incident light $L_2$ from the incident portion 2a is 100%, in the first area 2ca, approximately 67% of the incident light $L_2$, which corresponds to ⅔, is reflected to the smooth surface 2d, and the remaining approximately 33% of the incident light $L_2$ is emitted from the exit portion 22 to the outside. In the second area 2cb, approximately 34% of the incident light $L_2$, which corresponds to ½ of approximately 67% of the incident light $L_2$ from the first area 2ca, is reflected to the smooth surface 2d, and the remaining about 33% of the incident light $L_2$ is emitted from the exit portion 22 to the outside. In the third area 2cc, about 33% of the incident light $L_2$, which is the reflected light from the second area 2cb, is emitted from the exit portion 22 to the outside. As a result, the optical member 2 has a structure in which the amount of the emitted light $L_3$ is averaged among the first area 2ca to the third area 2cc to be approximately the same, and brightness unevenness due to the user's viewpoint position is reduced.

Figure 21:
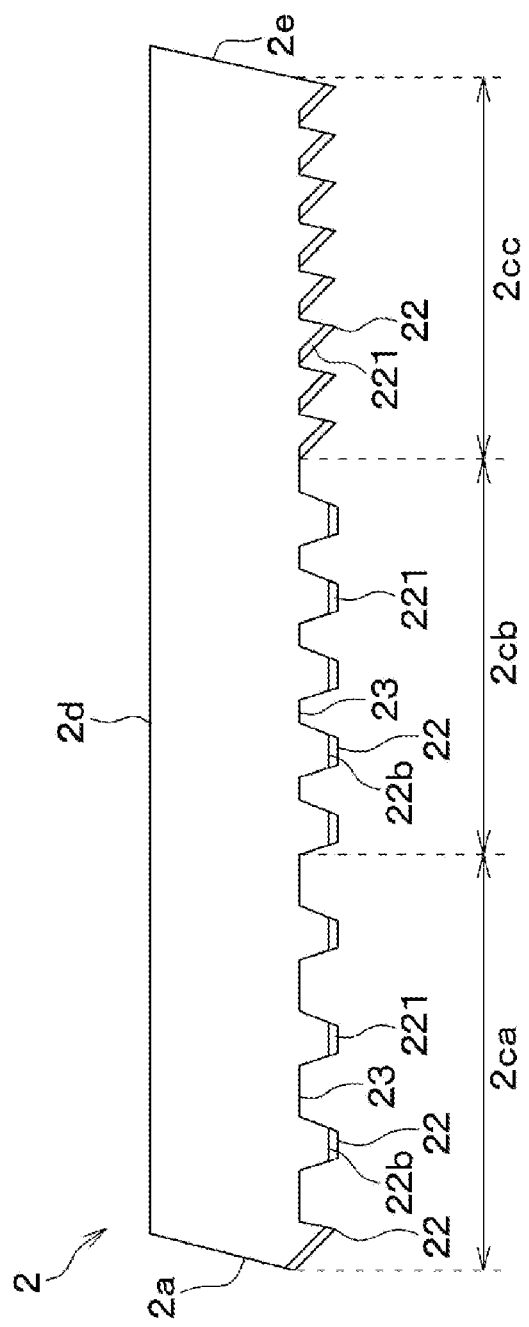
FIG. 21 is a cross-sectional view showing a modification of the optical member corresponding to FIG. 3.

In this case, as shown in FIG. 21, in the optical member 2, the exit portion 22 may be substantially trapezoidal in the cross-section, except for the third area 2cc located closest to the end surface 2e. In this case, in addition to the effect of reducing the brightness unevenness described above, it is possible to reduce noise caused by unintended reflection of the incident light $L_2$ on the second surface 22b of the exit portion 22 is suppressed in the first area 2ca and the second area 2cb.

Figure 22:
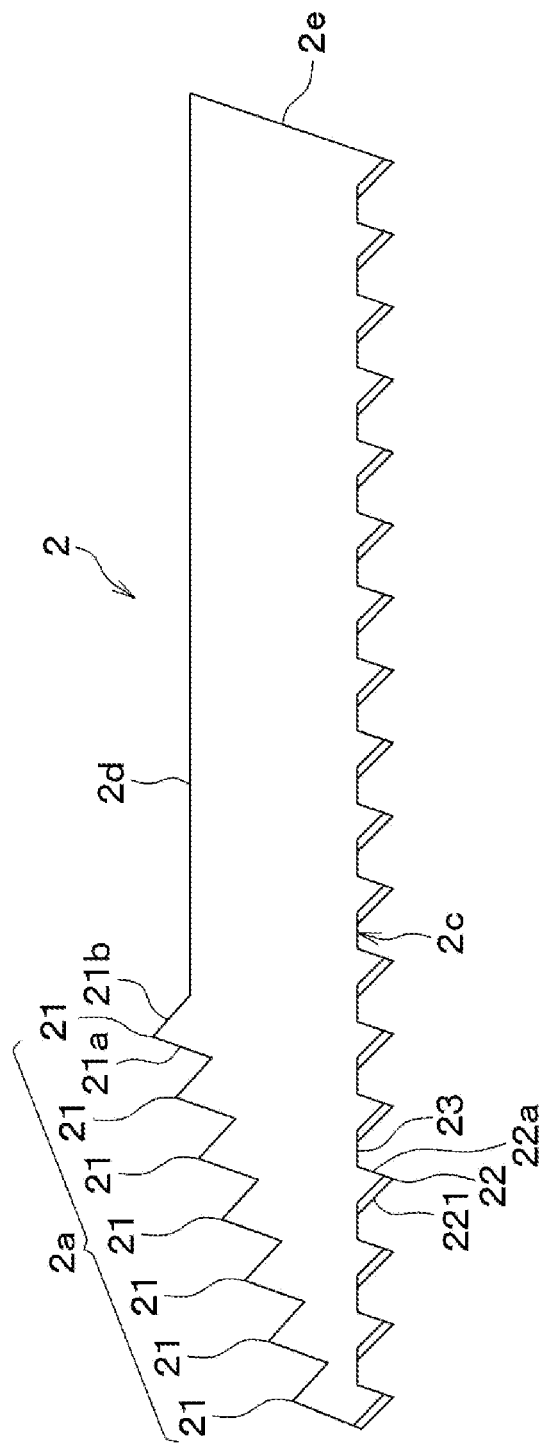
FIG. 22 is a cross-sectional view showing a modification of the optical member corresponding to FIG. 3.

(4) As shown in FIG. 22, in the optical member 2, the prisms 21 of the incident portion 2a are arranged in a prism array direction, and the prism array direction connects the exit surface 2c and the smooth surface 2d. Even in this case, the optical member 2 has a structure in which the two reflecting surfaces, that is, the flat portion 23 and the smooth surface 2d, do not shift relative to each other and can be easily attached to and detached from the holding member 3.

(5) In the optical member 2, some or all of the constituent elements may be replaced or freely combined in the other embodiments (1) to (4) with the first to fourth embodiments and modifications. For example, in the blind spot assistance device 1 of the first to fourth embodiments, a part of the exit portion 22 may be substantially trapezoidal, or the exit surface 2c is divided into plural regions and the interval between the exit portions 22 may be changed among the regions.

(6) The constituent element(s) of each of the above embodiments is/are not necessarily essential unless it is specifically stated that the constituent element(s) is/are essential in the above embodiment, or unless the constituent element(s) is/are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. In each of the above embodiments, when the shape, positional relationship, and the like of the constituent elements and the like are referred to, the shape, the positional relationship, and the like are not limited unless otherwise specified or limited to specific shapes, positional relationships, and the like in principle.

What is claimed is:

1. A blind spot assistance device comprising:
an optical member made of a transparent material, wherein the optical member having
an incident surface on which an external scene light is incident,
an exit surface at which an incident light incident from the incident surface arrives at a first time, the exit surface having a plurality of exit portions and a plurality of flat portions,
a smooth surface arranged opposite to the plurality of flat portions,
an upper surface and a lower surface arranged opposite to each other so as to connect the smooth surface and the exit surface,
a first protrusion protruding from the upper surface, and
a second protrusion protruding from the lower surface; and
a holding member having a fitting portion to fit with the first protrusion and the second protrusion of the optical member so as to hold the optical member, wherein
the plurality of flat portions is a first reflecting surface configured to reflect the incident light toward the smooth surface by total reflection,
the smooth surface is a second reflecting surface configured to reflect a reflected light reflected by the flat portion toward the exit surface by total reflection,
the plurality of exit portions emits outward a part of the incident light or a part of light reflected by the smooth surface, away from the holding member,
the holding member has a housing portion that houses the optical member,
the housing portion has a bottom surface facing the smooth surface of the optical member, and two side wall surfaces opposite to each other, adjacent to the bottom surface,
the two side wall surfaces have grooves fitted with the first protrusion and the second protrusion respectively,
each of the first protrusion and the second protrusion has a first end adjacent to the incident surface, and a second end opposite to the incident surface,
a height of the second end is greater than a height of the first end, a width is defined in a width direction connecting the lower surface and the upper surface in a normal direction to the lower surface, the incident surface of the optical member has one end away from the smooth surface, the width between the upper surface and the lower surface becomes narrower from the incident surface toward an end away from the incident surface, the width from the first protrusion to the second protrusion is greater than the width of the one end of the incident surface, the groove of the holding member that fits with the first protrusion is defined as a first groove, the groove of the holding member that fits with the second protrusion is defined as a second groove, the width from the first groove to the second groove is defined as $W_{32}$, the width from the first end of the first protrusion to the first end of the second protrusion is defined as $W_4$, the width from the second end of the first protrusion to the second end of the second protrusion is defined as $W_5$, and a relationship of $W_{32} < W_4 < W_5$ is satisfied.

2. A blind spot assistance device comprising:
an optical member made of a transparent material, wherein the optical member having
an incident surface on which an external scene light is incident,
an exit surface at which an incident light incident from the incident surface arrives at a first time, the exit surface having a plurality of exit portions and a plurality of flat portions,
a smooth surface arranged opposite to the plurality of flat portions,
an upper surface and a lower surface arranged opposite to each other so as to connect the smooth surface and the exit surface,
a first protrusion protruding from the upper surface, and
a second protrusion protruding from the lower surface; and
a holding member having a fitting portion to fit with the first protrusion and the second protrusion of the optical member so as to hold the optical member, wherein
the plurality of flat portions is a first reflecting surface configured to reflect the incident light toward the smooth surface by total reflection,
the smooth surface is a second reflecting surface configured to reflect a reflected light reflected by the flat portion toward the exit surface by total reflection,
the plurality of exit portions emits outward a part of the incident light or a part of light reflected by the smooth surface, away from the holding member,
the holding member has a housing portion that houses the optical member,
the housing portion has a bottom surface facing the smooth surface of the optical member, and two side wall surfaces opposite to each other, adjacent to the bottom surface,
the two side wall surfaces have grooves fitted with the first protrusion and the second protrusion respectively, and
a dimension from a center of the groove to the bottom surface in a thickness direction of the holding member is larger than a dimension from a center of the first protrusion or the second protrusion to the smooth surface in a thickness direction of the optical member.

3. The blind spot assistance device according to claim 2, wherein
each of the first protrusion and the second protrusion has a fitting convex, and
the groove has a recess that fits with the fitting convex.

4. A blind spot assistance device comprising:
an optical member made of a transparent material, wherein the optical member having
an incident surface on which an external scene light is incident,
an exit surface at which an incident light incident from the incident surface arrives at a first time, the exit surface having a plurality of exit portions and a plurality of flat portions,
a smooth surface arranged opposite to the plurality of flat portions,
an upper surface and a lower surface arranged opposite to each other so as to connect the smooth surface and the exit surface,
a first protrusion protruding from the upper surface, and
a second protrusion protruding from the lower surface; and
a holding member having a fitting portion to fit with the first protrusion and the second protrusion of the optical member so as to hold the optical member, wherein
the plurality of flat portions is a first reflecting surface configured to reflect the incident light toward the smooth surface by total reflection,
the smooth surface is a second reflecting surface configured to reflect a reflected light reflected by the flat portion toward the exit surface by total reflection,
the plurality of exit portions emits outward a part of the incident light or a part of light reflected by the smooth surface, away from the holding member,
the holding member has a plurality of hook pins as the fitting portion,
a part of the first protrusion and the second protrusion of the optical member protrudes outward of the smooth surface,
a fitting hole for fitting with the hook pin is formed in the part of the first protrusion and the second protrusion that protrudes outward of the smooth surface,
a light guiding direction is defined along one virtual plane formed by the plurality of flat portions of the optical member, light incident from the incident surface travelling in the light guiding direction,
a direction along a width direction connecting the upper surface and the lower surface is defined as a longitudinal direction in a state where the optical member is attached to the holding member, and
an angle formed between the light guiding direction and a direction connecting the fitting hole of the first protrusion and the fitting hole of the second protrusion is equal to an angle formed between an arrangement direction along which the plurality of hook pins is arranged in the longitudinal direction and a direction of the holding member along the light guiding direction.

5. The blind spot assistance device according to claim 4, wherein
the holding member has a lateral direction crossing the longitudinal direction in a state where the optical member is attached to the holding member,
at least two sets of the plurality of hook pins are arranged along the lateral direction, and
a plurality sets of the at least two sets of the plurality of hook pins are arranged in the longitudinal direction in parallel.

6. The blind spot assistance device according to claim 5, wherein the plurality sets of the at least two sets of the plurality of hook pins are arranged parallel to an outer edge of the holding member along the longitudinal direction.

* * * * *